United States Patent
Keceli et al.

(10) Patent No.: US 11,061,460 B2
(45) Date of Patent: Jul. 13, 2021

(54) TECHNIQUES IN PERFORMANCE AND EFFICIENCY IMPROVEMENTS OF PROCESSORS IN A COOLING SYSTEM

(71) Applicant: Intel Corporation, Santa Clara, CA (US)

(72) Inventors: Fuat Keceli, Portland, OR (US); Tozer J. Bandorawalla, Portland, OR (US); Grant McFarland, Portland, OR (US); Jonathan M. Eastep, Portland, OR (US); Federico Ardanaz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 16/457,354

(22) Filed: Jun. 28, 2019

(65) Prior Publication Data

US 2019/0324517 A1 Oct. 24, 2019

(51) Int. Cl.
*G06F 1/3203* (2019.01)
*G06F 1/3206* (2019.01)
*G06F 1/3234* (2019.01)
*G06F 1/3296* (2019.01)

(52) U.S. Cl.
CPC .......... *G06F 1/3206* (2013.01); *G06F 1/3243* (2013.01); *G06F 1/3275* (2013.01); *G06F 1/3296* (2013.01)

(58) Field of Classification Search
CPC ..................................................... G06F 1/3203
USPC ............................................................ 700/300
See application file for complete search history.

(56) References Cited

U.S. PATENT DOCUMENTS

| | | | |
|---|---|---|---|
| 9,811,143 B2 | 11/2017 | Eastep et al. | |
| 2012/0159201 A1* | 6/2012 | Distefano | G06F 1/206 713/300 |
| 2016/0062373 A1* | 3/2016 | King | G05B 15/02 700/300 |
| 2016/0147275 A1* | 5/2016 | Weissmann | G06F 1/324 713/322 |
| 2016/0291656 A1* | 10/2016 | Jenne | G06F 1/26 |
| 2017/0060220 A1* | 3/2017 | Grossmann | G06F 1/3296 |
| 2017/0364130 A1* | 12/2017 | Ho | G06F 1/3206 |
| 2019/0041925 A1* | 2/2019 | Ahuja | G06F 1/3296 |
| 2019/0045668 A1* | 2/2019 | Monson | H05K 7/20736 |

* cited by examiner

*Primary Examiner* — Suresh Suryawanshi
(74) *Attorney, Agent, or Firm* — Schwabe, Williamson & Wyatt, P.C.

(57) ABSTRACT

Embodiments of the present disclosure describe methods, apparatuses, storage media, and systems for Thermal Design Power (TDP) rebalancing among thermally-coupled processors and non-thermally-coupled processors, providing computing efficiency or homogeneity with respect to, including but not limited to, thermal requirements, power consumption, and processor operations. The TDP rebalancing may include implementing management circuitry and configuration control circuitry. Other embodiments may be described and claimed.

24 Claims, 13 Drawing Sheets

TECHNIQUES IN PERFORMANCE AND EFFICIENCY IMPROVEMENTS OF PROCESSORS IN A COOLING SYSTEM

STATEMENT OF GOVERNMENT INTEREST

This invention was made with Government support under Agreement No. B620873 awarded by the United States Department of Energy. The Government has certain rights in the invention.

FIELD

Embodiments of the present invention relate generally to power management for servers and other computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Advances in semiconductor processing and logic design have encouraged an increase in the amount of logic that may be present on Integrated Circuit (IC) devices. Meanwhile, computer system configurations have evolved from multiple ICs in a system to multiple hardware threads, cores, devices, and/or sub-systems. As the density of ICs has increased, corresponding power consumptions for computing systems have increased significantly. Therefore, associated and/or facilitating thermal management has become critical to computing performances.

Power and thermal management issues are considerations in designing computing systems. For example, in High Performance Computing (HPC) systems, a Thermal Design Power (TDP) may be specified to configure processor operations in conjunction with consideration of the implemented cooling resource. The TDP may refer to a guaranteed processor frequency for a reprehensive workload. In a thermally constrained computing system of multiple processors sharing a common cooling resource or a cooling path, fixed TDPs may lead to excessive cooling headroom, hence inefficiency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
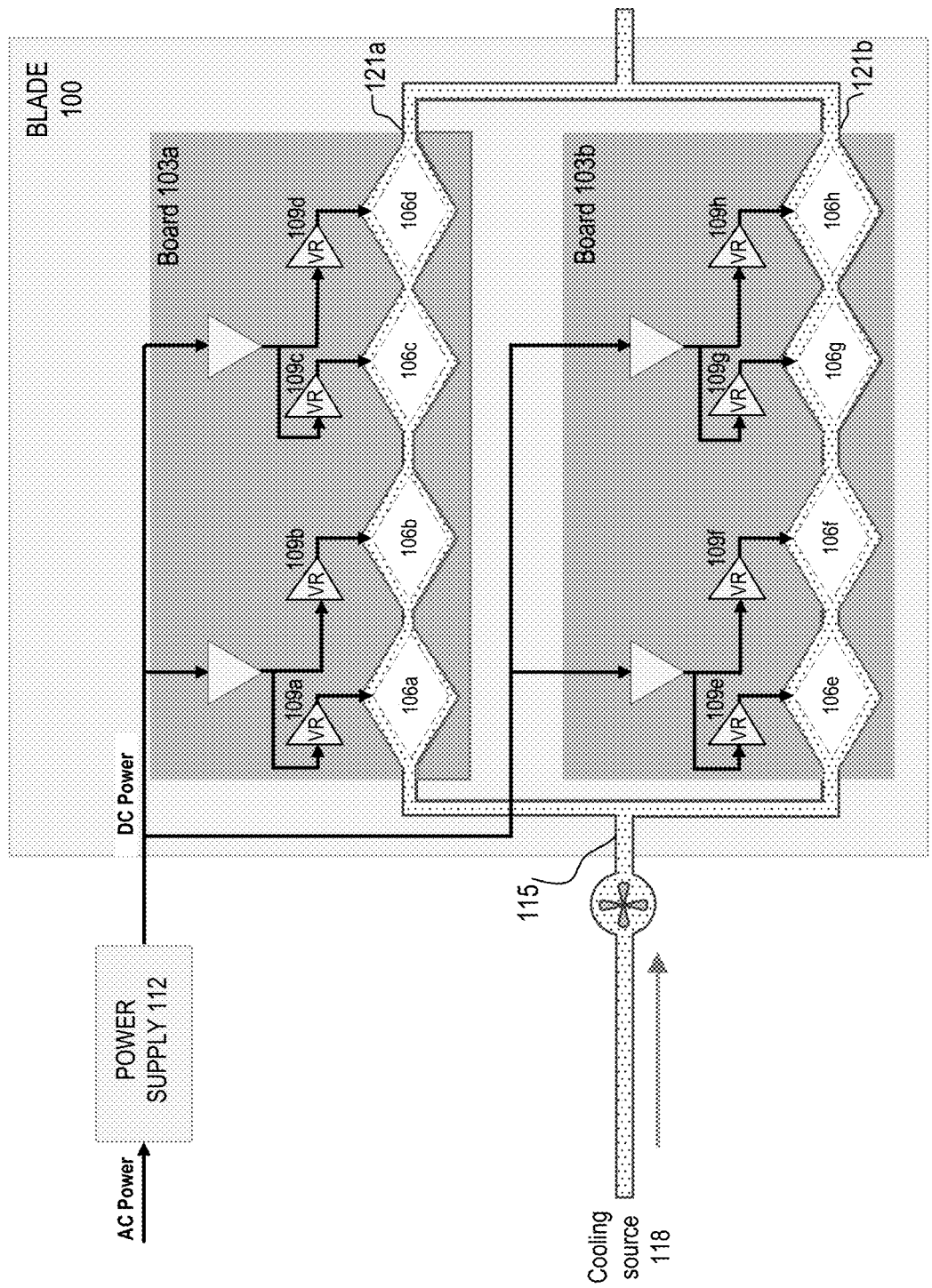
FIG. 1A schematically illustrates an example architecture of computing blades in accordance with various embodiments, and FIG. 1B schematically illustrates a corresponding layout of the example architecture implemented with a cooling system.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," "in embodiments," or "in some embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SoC), system in a package (SiP), processors, central processing unit (CPU), graphics processing unit (GPU), processors on chip (POC), memory, or input/output (IO) port that provides the described functionality. In some embodiments, the circuitry may execute one or more software or firmware modules or programs to provide the described functions. In some embodiments, circuitry may include logic, at least partially operable in hardware. "Circuitry," "integrated circuits," "components," and "devices" may be used interchangeably herein.

As used herein, the term "processor(s)" may refer to, be part of, or include one or more processor cores or CPUs, one or more application processors, one or more microprocessors, one or more co-processors, one or more graphics processing units (GPUs), one or more reduced instruction set computing (RISC) processors, one or more Acorn RISC Machine (ARM) processors, one or more complex instruction set computing (CISC) processors, one or more communication fabric processors, one or more digital signal processors (DSP), one or more FPGAs, one or more Programmable Logic Device (PLD), one or more ASICs, one or more microprocessors or controllers, or any suitable combination thereof. In some embodiments, the processor(s) may comprise, or may be, a special-purpose processor/controller to operate according to the various embodiments herein. As examples, the processor(s) may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like.

For purpose of discussion herein, certain examples may be described with regard to HPC systems. However, the scope of the present disclosure is not limited to HPC examples, and embodiments are highly scalable to enable solutions for different types of systems such as any cloud, big data, HPC, or other systems to low power computer systems such as laptop or Ultrabook™, tablet computers, smartphones, and other portable devices.

Various embodiments herein describe methods, apparatuses, storage media, and systems for TDP rebalancing among thermally-coupled processors and/or non-thermally-coupled processors, providing computing efficiency and/or homogeneity with respect to, including but not limited to, thermal requirements, power consumption, and processor operations. The TDP rebalancing may include implementing management circuitry and configuration control circuitry to improve computing efficiency by configuring TDP budgets among the thermally-coupled processors, in consideration of, but not limited to, certain priority schemes, critical path optimization in bulk synchronous parallel computing, and/or reactive thermal budget redistribution. A TDP rebalancing approach may improve homogeneous computing among both thermally-coupled and non-thermally-coupled processors by determining a sustainable operating frequency utilizing TDP configurations. Other embodiments may be described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A schematically illustrates an example computing blade (hereinafter "blade 100") of thermal shadowing effect in accordance with various embodiments herein. The blade 100 may be, or be a part of, a rack unit, a blade server, a blade enclosure, or the like under a thermal shadowing effect. When a plurality of components are with a thermal shadowing effect, the components may be thermally coupled in a cooling system and the thermal state of one component may affect another's. Those components may share a common cooling resource and a common cooling path. The blade 100 may include one or more boards, for example, 103a and 103b. Each board 103a or 103b may include multiple processors, for example, 106a-d and 106e-h respectively. The board 103a or 103b may include a number of processors, in which the number is equal to or greater than two. The board may be a Printed Circuit Board (PCB) or board with other form factors, e.g., System-on-Chip (SoC) and System-in-Package (SiP). In one example illustrated in FIG. 1A, the board 103a includes four processors 106a-d and associated components. Those associated components may include, but are not limited to, respective voltage regulators (VRs) 109a-d and/or other associated components, such as, memory modules, passive electrical components, other components on a PCB, etc. A processor may include one or more cores for computing and processing. The processor may have a thermal sensor (not shown) to detect an instantaneous temperature of the process while operating. The detected temperature may be used as an operating temperature to indicate the thermal condition of processor operation. The thermal sensor may be placed at a particular location in the processor to measure a junction temperature. The processor or its subsystems may operate at various operating frequencies under different input voltages provided by their corresponding voltage regulators. Those corresponding voltage regulators may be referred to as fully-integrated VRs, which may be integrated with or part of the processor circuitry (not shown). Additionally or alternatively the discrete VR depicted in the figure may modulate the whole processor voltage to change its overall input voltage. For a single processor, a higher average operating frequency may require higher input voltage provided by a voltage regulator to that particular processor. Accordingly, higher input voltage and higher operating frequency may generate more heat and increase processor temperature. Further details regarding the processor operation with temperature and frequency are discussed with respect to FIG. 2.

In some embodiments, those associated components, including the voltage regulators 109a-h, may be integrated on the PCB, SoC, or SiP. Alternatively, some or all of the associated components may be standalone components or Integrated Circuits (ICs). Some or all of those components may be located in close proximity to the corresponding processors 106a-h.

Figure 1B:
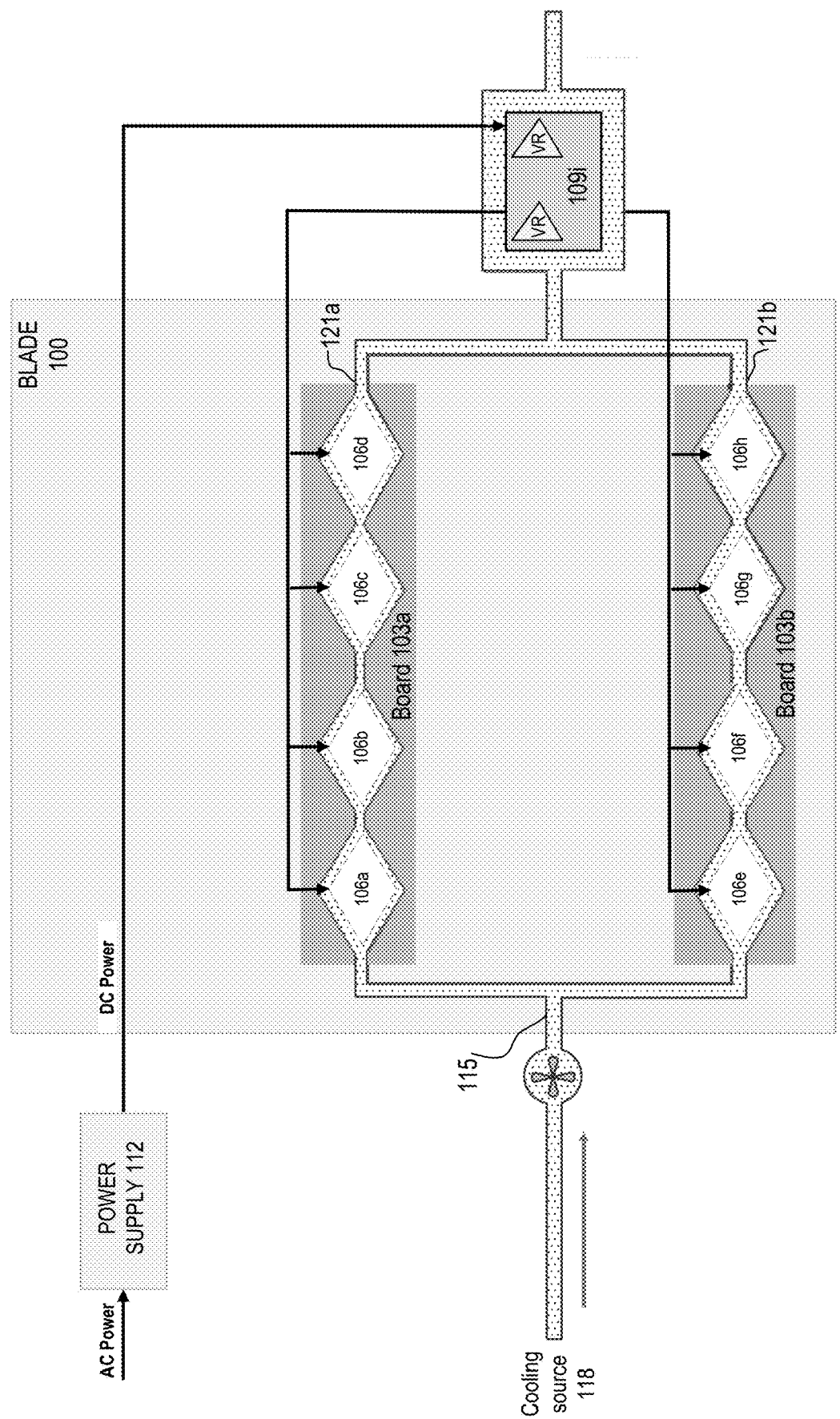

FIG. 1B schematically illustrates a thermal layout of the example Blade 100 with a cooling system implementation. The VRs 109a-h and/or some other associated components may be in a thermally downward cooling steam from the corresponding processors 106a-h. For example, the VRs and/or some other associated components may be thermally together experiencing the same or similar cooling effect provided by the cooling system, which are shown as VRs

109*i*. Thus, one or more separate thermal sensors may be used to detect thermal conditions of the VRs and/or other components.

A power supply 112 may be electronically coupled with the boards 103*a*-*b* to provide Direct Current (DC) power supply to the regulators 109*a*-*h*, via a hierarchy of associated components. The power supply 112 may be electronically coupled with both or either of the boards 103*a*-*b*. The power supply 112 may be a separate component or device to the boards 103*a*-*b*, or be integrated with or part of at least one of the boards 103*a*-*b*. The power supply 112 may also be integrated with or part of the blade 100. The power supply 112 may include, not shown in FIG. 1A or 1B, a power distribution unit to provide Alternating Current (AC) and one or more rectifiers to convert the AC power to DC power and deliver the DC power to the regulators. The DC power provided to the regulators 109*a*-*h* may be considered as high voltage and the voltage regulators 109*a*-*h* may down-convert the DC power to provide adequate input power to the processors 106*a*-*h*. The regulators 109*a*-*h* may respectively regulate the output powers to the processors 106*a*-*h*. The input powers for the processors 106*a*-*h* may be regulated or controlled individually, as a group, or a combination of both. Further details are to be discussed in various embodiments. Additional regulation components may be required with respect to regulating the power supply.

A cooling system 115 may be implemented in or through the blade 100 to provide thermal aid or thermal control to maintain acceptable temperature for processor operation and/or prevent overheating of the processors 106*a*-*h* and other associated components. The processors 106*a*-*h* may share a common cooling source 118. The cooling system 115 may have cooling agent flowing from the common cooling source 118 to the end of the boards 103*a*-*b*, which is shown in the dotted flow around and through the processors 106*a*-*h*. A cooling agent may be constituted of various materials of liquid or gas.

In the example of FIGS. 1A and 1B, the cooling source 118 splits into two line paths that feed into the boards 103*a* and 103*b* respectively. Note that in other embodiments, the cooling source 118 may feed one board or line of processors only, or multiple boards/paths. For an illustrative and simplified description herein, only the processors 106*a*-*d* of the board 103*a* may be thermally coupled with each other, but not with processors or other components not on the board 103*a*, because the processors 106*a*-*d* are to share the same cooling path 121*a*. Under a thermally-coupled condition, one processor's thermal condition may affect another processor's, because of the shared thermal path. For example, if the processor 106*a* experiences a higher temperature, such higher temperature may heat the cooling agent more so that the cooling agent may have an increased temperature when arriving at the processor 106*b* than it normally has. Thus, the processor 106*b* may experience less cooling assistance that can be provided by the cooling path 121*a* at or around processor 106*b*. Similarly, the processors 106*c* and 106*d* may be thermally coupled with 106*a* and 106*b* for the same reason, also known as thermally interactive. Therefore, the processors 106*a*-*d* may share a common thermal budget that can be provided by the cooling system 115. However, it is assumed that the processors 106*a*-*d* may not be thermally coupled with the processors 106*e*-*h*, because the two sets of processors have dedicated cooling paths 121*a* and 121*b*.

The blade 100 and its boards 103*a*-*b* may be thermally constrained in an HPC system, which means the processors may not operate at their maximum capacities simultaneously. Otherwise, for example, maximum power delivered to the board 103*a* may cause overheating issues to at least one of the processors 106*a*-*d* and consequent malfunctions of the processors, boards, or even the blade system. Such an overheating may exceed the cooling compensation that can be provided by the cooling path 121*a*. Note that the cooling path 121*a* may provide a cooling budget that is to be shared by all the thermally coupled processors 106*a*-*d* on the line. Such a cooling budget may be measured with power in Watt (W) or energy.

Figure 2A:
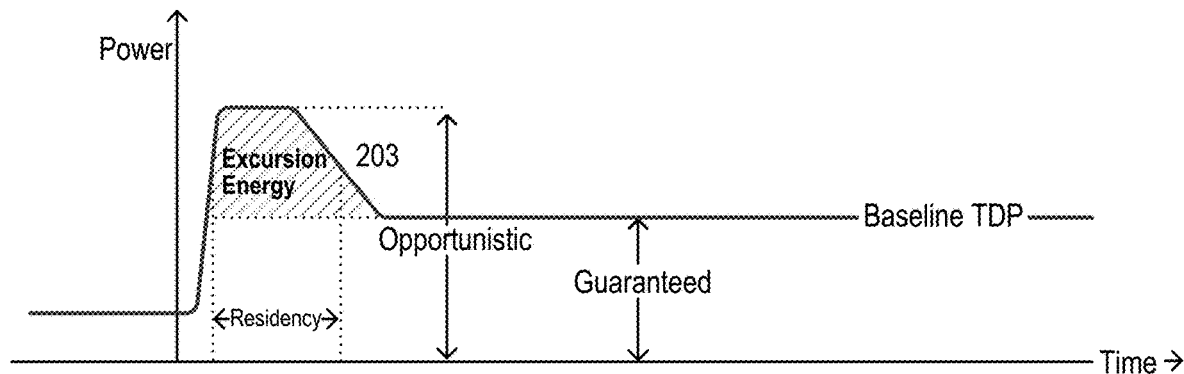
FIGS. 2A-2C depict detailed operations of a processor with thermal considerations in accordance with various embodiments.
Figure 2B:
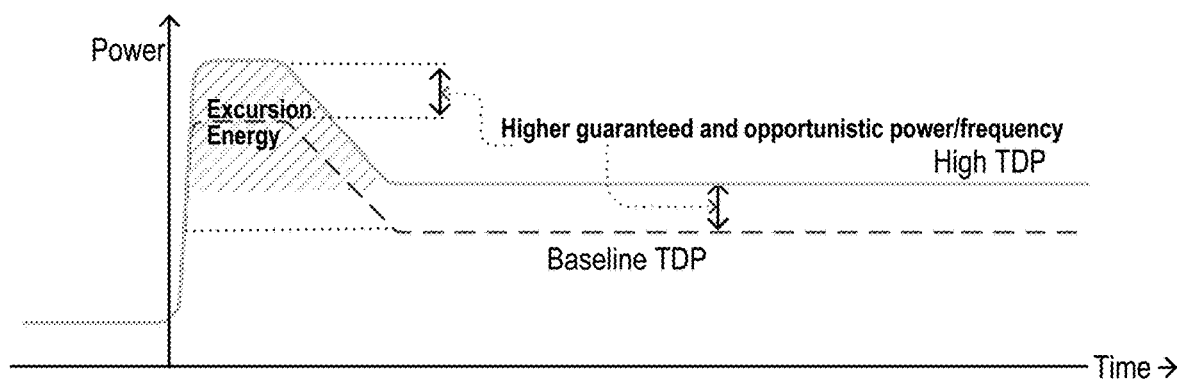
Figure 2C:
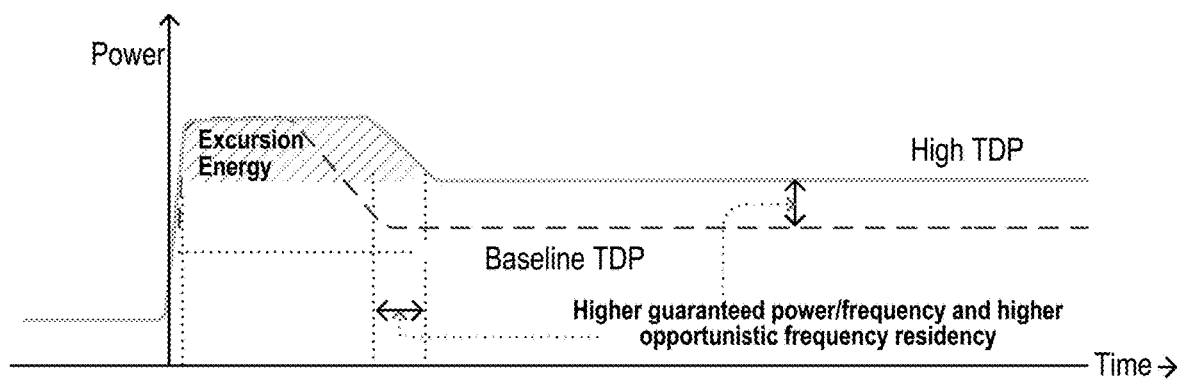

FIGS. 2A-2C depict detailed operations of a processor with thermal considerations in accordance with various embodiments. The processor may be one of the processors 106*a*-*d*. The processor may include one or more cores and be associated with a corresponding socket. Note that the descriptions herein may also be applicable to other components (e.g., VRs), but only "processors" are used for illustrative discussion. As introduced in FIGS. 1A and 1B, the processor may operate at various operating frequencies to provide various computing powers. A higher operating frequency, which usually means a higher computing power and shorter data processing time, may require a higher input power, which may lead to potentially more generated heat, higher processor temperature, and/or require more thermal dissipation provided by the cooling path 121*a*. In the example of a thermally constrained blade 100 implemented with the cooling system 115, a thermal Design Power (TDP) may refer to a maximum amount of power or heat generated by the processor or a component that the cooling system 115 is designed to dissipate. The term "TDP" may also be referred to as headroom or thermal credit. In existing HPC systems, a TDP of a processor may be set statistically according to some worst-case scenarios when other thermally coupled processors and/or VRs are assumed to operate with high input power and generating relatively large, if not maximum, heat onto the board 103*a* in FIG. 1A. Thus, when not all the processors 106*a*-*d* are operating at their highest power consumption, the cooling system 115 may not need to operate at its maximum capacity to dissipate all the generated heat by the processors. In other words, some cooling resource may be not utilized completely, which indicates better processor performance may be achieved by increasing some operating frequencies and utilizing the remaining cooling resource by the cooling path 121*a*.

In some embodiments, the processors 106*a*-*h* may be implemented with Dynamic Voltage and Frequency Scaling (DVFS), wherein all or a portion of the unused cooling budget, also known as cooling credit or power headroom, may be assigned to a particular processor among thermally coupled processors and this processor may increase its operating frequency based on certain conversion rules between the assigned cooling budget and operating frequency increase. Dynamic frequency scaling (also known as CPU throttling) is a technique in computer architecture whereby the frequency of a processor can be automatically adjusted "on the fly" depending on the actual needs, to conserve power and reduce the amount of heat generated by the processor. Dynamic frequency scaling may help preserve battery on mobile devices and decrease cooling cost and noise on quiet computing settings, or can be useful as a security measure for overheated systems (e.g., after poor overclocking). Dynamic frequency scaling is used in all ranges of computing systems, ranging from mobile systems to data centers to reduce the power at the times of low workload. On the other hand, in various embodiments herein, the processor may increase operating frequency for high workload when cooling budget allows. In this way, better system performance may be achieved by shortening workload runtime.

FIG. 2A illustrates a baseline TDP, which may correspond to a guaranteed power budget allocated to the processor, in which the guaranteed power budget may correspond to a guaranteed operating frequency for the processor at a guaranteed operating state. This baseline TDP may be obtained by the above-mentioned worst-case scenario operation, by a system setting, or by other methods. In an existing system, a processor of a particular binning or specifications may be associated with only one TDP value. Such a TDP value may be calibrated or re-determined by some board/blade/system calibration, but the TDP value of a processor may not be re-assigned dynamically during operation. In an HPC system, different processors may have different baseline TDP values, e.g., due to different manufacturing binnings or specifications. Thus, multiple TDPs can be considered in an HPC system. However, a single TDP is used in the description herein to simplify the discussion. FIG. 2A further shows the processor may run at an opportunistic state 203 with higher operating frequency, also known as opportunistic frequency, to increase computing power, when a workload may benefit from such an opportunistic operation. The opportunistic state 203 may be associated with an excursion energy that may need to be considered in the overall TDP budget of the cooling path 121a and be dissipated properly by the cooling path 121a for proper processor and board operation without overheating. The process may operate under the opportunistic state for a time of residency. The residency time may be determined based on available thermal excursion budget.

In various embodiments herein, one or more additional TDPs besides baseline TDP may be assigned and used by the processors, statistically or dynamically, to achieve better system performance. These additional TDPs may represent different cooling capabilities of a cooling system. The additional TDPs may have higher values than the baseline TDP value so that the processor may operate at higher frequencies and yield the same silicon junction temperature under a system with different cooling capabilities. A plurality of TDPs may be configured to provide multiple operating frequency options, and the additional TDPs may have higher or lower values than the baseline TDP. However, only one higher TDP value is discussed to illustrate the general approach in FIGS. 2B and 2C.

FIG. 2B illustrates the processor may be assigned with a high TDP to run at a higher frequency to increase computing power, when a workload may benefit from such an operation and the corresponding thermal line budget allows. A thermal line budget may refer to a total thermal budget of the processors and/or other components sharing the same cooling path. By increasing the baseline TDP value to a high TDP value, the corresponding opportunistic operation may result in a higher opportunistic operating frequency as well. Additionally or Alternatively, FIG. 2C illustrates a longer residency for running under an opportunistic state of the same excursion power as the baseline in addition to the high TDP. Similarly, various residencies may be available for a particular processor based on the consideration of the available thermal budget of the line.

Figure 3:
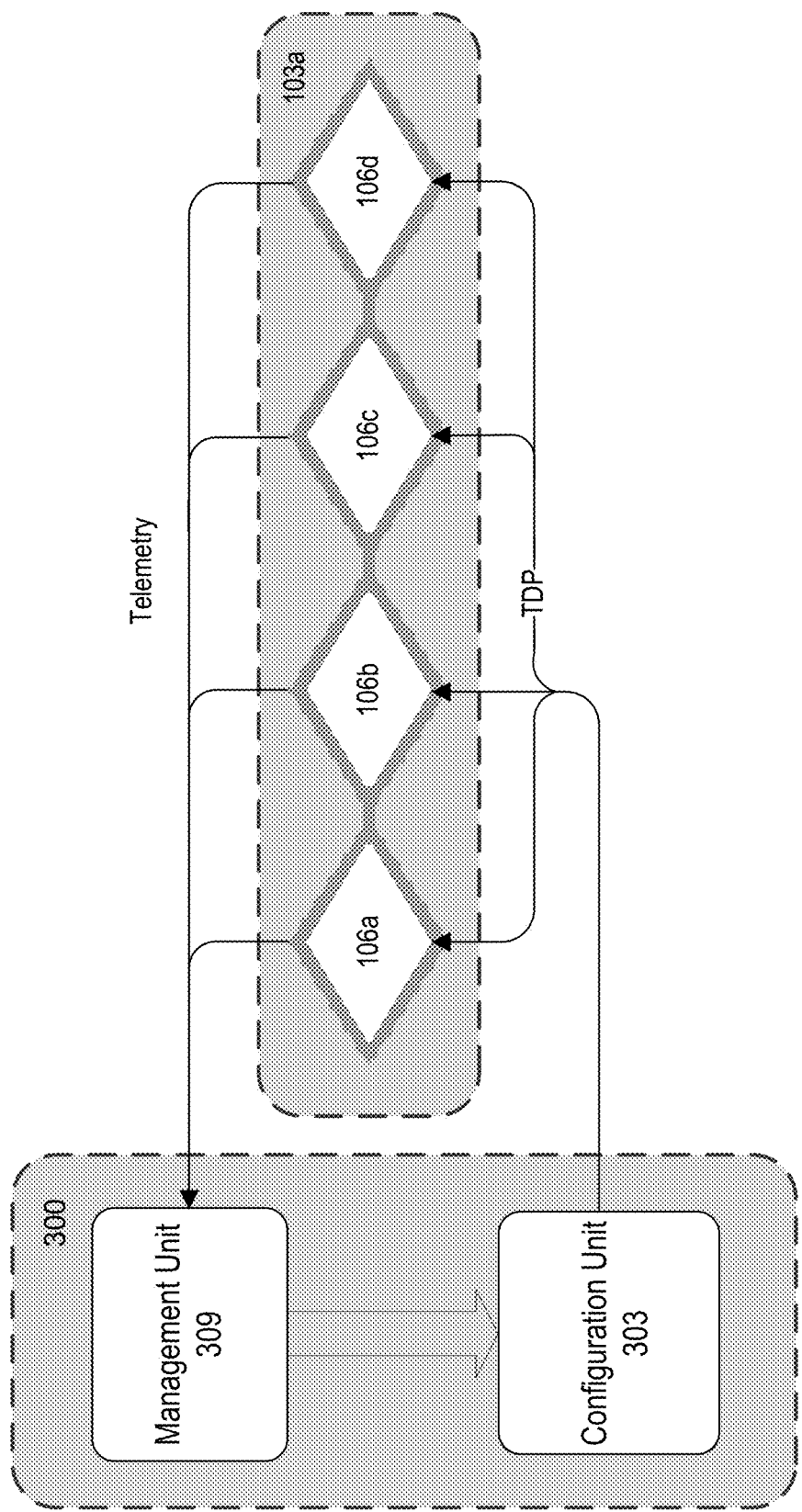
FIG. 3 schematically illustrates one example TDP rebalancing control system in accordance with various embodiments.

FIG. 3 schematically illustrates one example TDP rebalancing control system 300. (hereinafter "system 300"). The system 300 may include a configuration unit 303 that may configure respective TDP values to a plurality of thermally-coupled processors, for example the processors 106a-d, of the blade 100 individually. The configuration unit 303 may be implemented by an IC or other circuitry. Note that the system 300 may be implemented with more processors and boards in a blade, but only processors 106a-d are illustrated to simplify the discussion herein. Different TDP values may corresponds to different operating frequencies to a particular processor. Uniform processors with the same baseline TDP are used in this example illustration. However, various processors with different baseline TDPs may be used as well. The configuration unit 303 may configure the thermally coupled processors 106a-d based on a safe list (not shown). The safe list may include a set of TDP configurations. Each TDP configuration may include a set of TDP values that may be configured to respective thermally-coupled processors 106a-d so that the thermally coupled processors may operate with various corresponding guaranteed operating frequencies under safe thermal limits without processor malfunction or crash due to thermal issues. A plurality of TDP values may be available to be configured to the processors. For example, the TDP values may include baseline TDP, high TDP, and low TDP. Additional TDP values may also be available for processor TDP configurations. The configuration unit 303 may configure the processors 106a-d with a TDP configuration of the safe list, upon an instruction from a management unit 309. The configuration unit 303 may configure the processors 106a-d with an initial TDP configuration by system default.

The system 300 may also include the management unit 309. The management unit 309 may be implemented in an IC or other circuitry. The management unit 309 may collect thermal information of the processors through one or more telemetries. The telemetries may include thermal sensors to detect temperature of the processors and/or associated components. The telemetries may also include elements to detect, diagnose, or receive other information with regard to the processors, such as power consumptions, operating frequencies, etc. The management unit 309 may receive corresponding signals reporting or alerting certain status of the processors and associated components. For example, one or more thermal sensors may be placed at specific locations in the processor and detect temperature of the processor. The detection may be to detect silicon junction temperature and/or other specific locations in the processor to indicate an operating temperature of the processor. The management unit 309 may analyze the collected thermal information and determine a TDP configuration accordingly to achieve better system efficiency or performance.

Alternatively or additionally, the thermal sensors may be triggered to send a signal to the management unit 309 if the corresponding measured temperature exceeds a threshold value. In some embodiments, the processor and/or VR may be turned off to protect circuitry and components once a corresponding temperature exceeds the threshold.

The management unit 309 may instruct the configuration unit 303 to configure the processors 106a-d. Further details regarding the determination of the TDP configuration and various applications are discussed with respect to FIG. 3 and various following figures. The system 300 may be part of or connected to a power management module or device in an HPC system. Various elements of the system 300 including, but not limited to, the safe list, the configuration unit 303, and the management unit 309 may be implemented in various forms, such as privileged/kernel mode software, firmware, hardware that is part of one or more processors, discrete circuitry, IC, or other like forms. Various implementations of the system 300 are discussed in more detail infra with respect to FIG. 10.

The safe list may include a set of TDP configurations. Each TDP configuration may include a set of TDP values that may be configured to respective thermally-coupled processors 106a-d so that the thermally coupled processors may operate with various corresponding operating frequencies under safe thermal limits without processor malfunction or crash due to thermal issues. The safe list may be generated and stored in a separate entity, in the management unit 309, or in the configuration unit 303. The safe list may be accessible to the management unit 309 and the configuration unit 303 regardless of its location or the form of storage. The safe list may be determined based on processor/socket priorities during system calibration or initialization. The set of TDP configurations of the safe list may be generated by a cooling system test, which may be based on an in-real-use cooling system or a prototype cooling system with in-real-use processors or prototype processors. The set of TDP configurations may correspond to cooling capability of the implemented cooling system. Additionally or alternatively, each TDP configuration may be determined based on other ambient temperatures and the determination of the TDP configurations may be based on one or more mathematical models, or a combination of one or more mathematical models and one or more thermal tests.

The system 300 may be used in conjunction with various system considerations to improve computing performance and efficiency, or improve homogenous computing. Four example applications are illustrated herein, but the system is not limited to the illustrated embodiments herein. In addition, any combinations of the example applications are feasible in achieving further system optimization.

TDP Rebalancing Considering Priority Schemes

In a cloud data center, a plurality of discrete job requests, as well as leasing request for virtual machine time, may be submitted by multiple users. Various job requests may be labeled or determined with different priorities, depending on the type of the job or other attributes of the job. For example, some jobs may be low or medium priority if they do not require a strict and short deadline to finish; meanwhile, other jobs may be characterized with high priorities if they demand fast performance and are time sensitive. In some other applications, some users may have higher priority than others and be assigned with better computing resources, based on system arrangements or other external arrangements. For example, a user may pay an additional fee to gain higher priority for its job requests. Thus, it may be beneficial to be able to configure different TDP values to respective sockets or processors who are to take job requests of different priorities to satisfy various priority requirements.

In various embodiments, the safe list may be generated to correspond to certain priorities related to workload entries, sockets or processors, or user priorities, in conjunction with the capability of the cooling system. In one example, thermally coupled processors may be tasked with a plurality of entries. Each entry may be characterized with a vector that indicates respective desired priorities associated with respective processors or sockets. The desired priorities may be determined based on work entry priority, user priority, processor priority, or other priorities, or any combination thereof. Table 1 shows an example priority assignment, where Socket 1 and Socket 2 may be assigned with a priority value. In this example, the priority values may be represented by a normalized value between 0 and 1, in which "0" represents lowest priority and "1" represents highest priority. Different priority values may correspond to different TDP values, hence different operating frequencies. The priority values may be mapped to TDP values following a linear conversion or other non-linear conversions. For example, priority value "1" may be mapped to a maximum allowable TDP value and value "0" may be mapped to a lowest TDP value. The various TDP values may be acquired or determined by the cooling system test at manufacturing or during system calibration or initialization. The TDP value determination may be recalibrated during system operation in the field or updated periodically. In the example of Table 1, For Entry 1, both Socket 1 and Socket 2 have the highest priority; for Entry 2, Socket 1 has a lower priority than Socket 2; for Entry 3, Socket 1 has an even lower priority with a value of 0.2 and Socket 2 has the highest priority; for Entry 4, Socket 1 has the highest priority and Socket 2 has a lower priority with a value of 0.5.

TABLE 1

```
Priority List = [
// Socket #:   1   2
    [1   , 1  ], // Entry 1: Sockets 1 and 2 have the same highest priority
    [0.5, 1  ], // Entry 2: Socket 1 has lower priority
    [0.2, 1  ], // Entry 3: Socket 1 has even lower priority
    [1   , 0.5], // Entry 4: Socket 2 has lower priority
]
```

Figure 4:
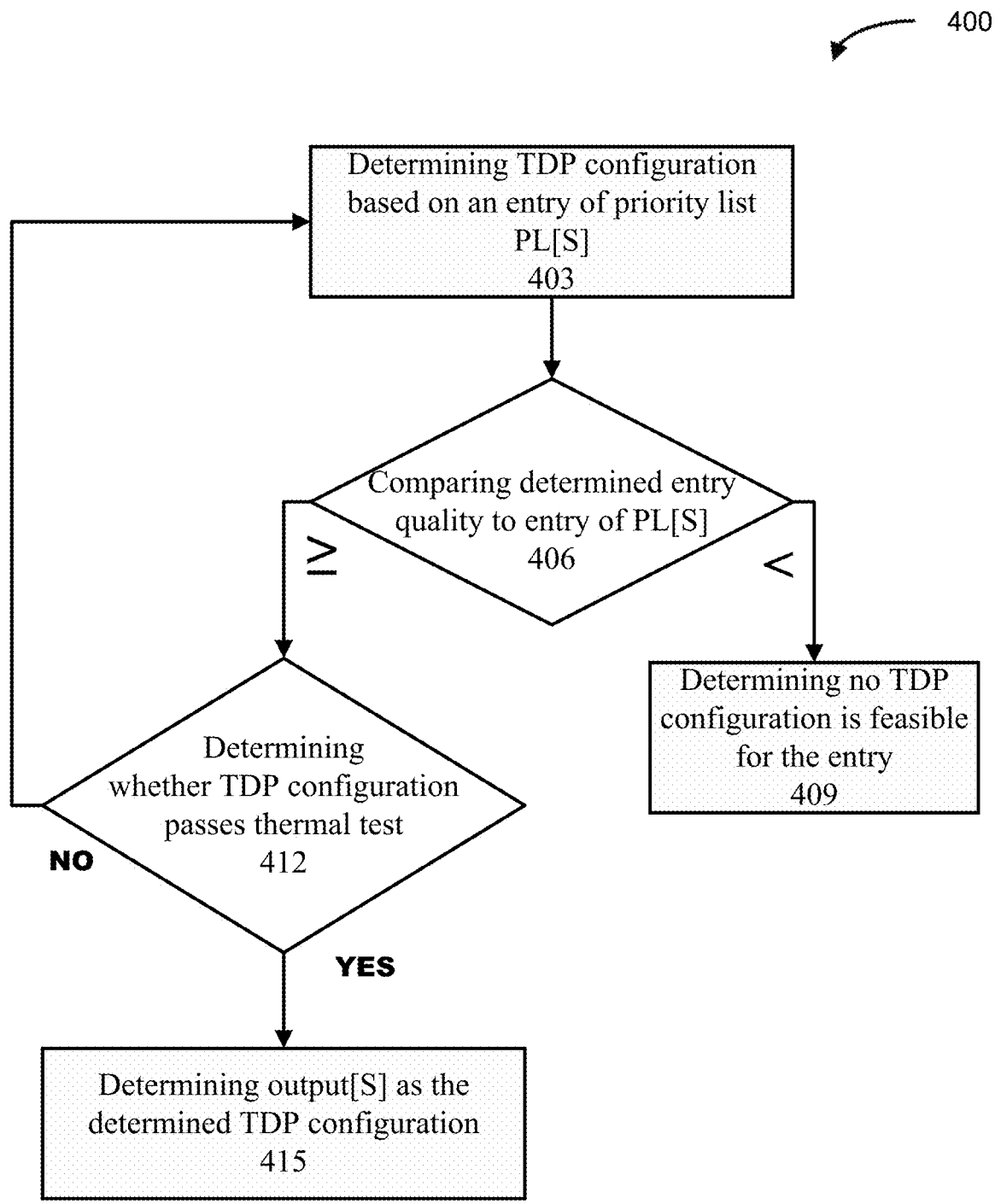
FIG. 4 illustrates an operation flow/algorithmic structure to facilitate a process of determining a set of TDP configurations in consideration of priorities of workload entries, in accordance with some embodiments.

FIG. 4 illustrates an example operation flow/algorithmic structure 400 to facilitate a process of determining a set of TDP configurations in consideration of priorities of workload entries, in accordance with some embodiments. The operation flow/algorithmic structure 400 may be performed by the system 300 or circuitry thereof. Note that all the thermally-coupled processors are assumed to be identical from the same bin to simplify the discussions. But processors from different bins or of different specifications may implement the same or substantially similar operation flow. The example operation flow/algorithmic structure 400 may be a part of the cooling system test.

The operation flow/algorithmic structure 400 may include, at 403, determining a TDP configuration based on an entry from a priority list, PL[S]. The TDP configuration may include a set of TDP values to be respectively configured to the thermally-coupled processors 106a-d. The determined TDP configuration may be selected from a plurality of TDP configurations that include all possible TDP combinations regarding all thermally-coupled processors 106a-d. All possible TDP combinations may be pre-determined by manufacturing or other related tests, and the combinations may be stored in or accessible to the system 300. The entry from the priority list, PL[S] may indicate priority information of a job entry with respect to one or more processors. The priority information may be assigned based on user priority, job request priority, or other priority schemes. Taking into consideration of the priority value from the entry, a TDP configuration whose TDP values are the highest match corresponding to the priority value may be selected initially. Or an arbitrary TDP configuration may be determined for initializing the process. When such a determined TDP fails a thermal test, another TDP configuration with one or more lower TDP values may be selected for another round of test, which will be discussed in more detail infra with respect to step 412. Note that a TDP value may represent or correspond to a TDP budget, which may indicate a power level or power consumption can be delivered to the processor and/or an operating frequency of the processor.

The operation flow/algorithmic structure 400 may further include, at 406, comparing an entry quality of the determined TDP configuration with an entry quality designated from the PL[S]. An entry quality may correspond to TDP values of a TDP configuration, or indicate an overall performance quality regarding the entry considering, but not limited to, time to complete the entry of workload, delay to begin processing the entry, and other matrices. Here, for example, the TDP values of the determined TDP configuration may be compared with the TDP values of the priority list, PL[S]. If the entry quality of the determined TDP configuration is better or greater than the entry quality from the PL[S], it means that the determined TDP configuration satisfies the priority request from the priority list. Otherwise, it means the determined TDP configuration cannot satisfy the priority request from the priority list.

The operation flow/algorithmic structure 400 may further include, at 409, determining no TDP configuration is feasible for the entry to satisfy the priority request from the PL[S]. This determination may be made when the determined TDP configuration corresponds to the lowest possible match to the priority request satisfying the user criteria for match quality and the TDP configuration cannot satisfy the priority request. In this case, priority request may be ignored and execution may continue with the default TDP configuration.

The operation flow/algorithmic structure 400 may further include, at 412, determining whether the TDP configuration can pass a thermal test. The thermal test may be considered to be failed if at least one processor, VR, or other relevant component exceeds its threshold temperature, while the TDP configuration is configured to the processors. The thermal test may be the same, substantially the same, or a part of the cooling system test. If the determined TDP configuration fails the thermal test, another TDP configuration may be selected to go through the process again. The next selected TDP configuration may be the TDP configuration that is the closest one to the failed TDP configuration but corresponds to less entry quality, from the all possible TDP configurations. This process may cycle until a TDP configuration can pass the thermal test or until no TDP configuration can be tried.

The operation flow/algorithmic structure 400 may further include, at 415, determining an output[S] to indicate the determined TDP configuration if the determined TDP configuration satisfies both the entry quality requirement and passes the thermal test. Therefore, a TDP configuration that satisfies the particular priority request may be added to the safe list. Note that there may be more than one TDP configuration that satisfies the particular priority request.

In some embodiments, the flow structure 400 or a substantially similar flow chart may be used to determine a set of TDP configurations for a plurality of entries with a priority list PL[L][N], where L represents the number of entries in the priority list, N represents the number of the thermally-coupled processors in use or to be used. TdpC[KN][N] include all possible TDP configurations for N processors and the values are normalized to the highest TDP value. TdpC[KN][N] may be formed in a plurality of rows and each row represents one of the possible TDP configurations. For each TDP configuration selection, a row of TDP configuration may be selected. If the selected TDP configuration would not pass the thermal test, a next match that satisfies the user criteria for minimum match quality may be selected and tested.

In some embodiments, an error quality or error score may be used to set the match quality. For example, an error quality may be determined between the determined TDP values and the request entry quality via root mean square error, to minimize the error quality. If the number of the all possible TDP configurations is reasonable, an exhaustive search may be conducted to determine a matched TDP configuration.

In some embodiments, certain criteria may be considered, such as best match to user priority via error score, best performance, and no violate thermal constraints. Other criteria may also considered for some other embodiments.

In some embodiments, guard-band TDP budget may be added while considering TDP configuration determination to provide some buffer in distributing TDP budget. This may be because some workload entries may cause thermal failure when TDP configuration is set close to TDP budget limits. The guard-band TDP budget may be used as a protection mechanism in addition to the above-mentioned TDP configuration determination.

II. TDP Rebalancing Considering Critical Path Optimization

Figure 5:
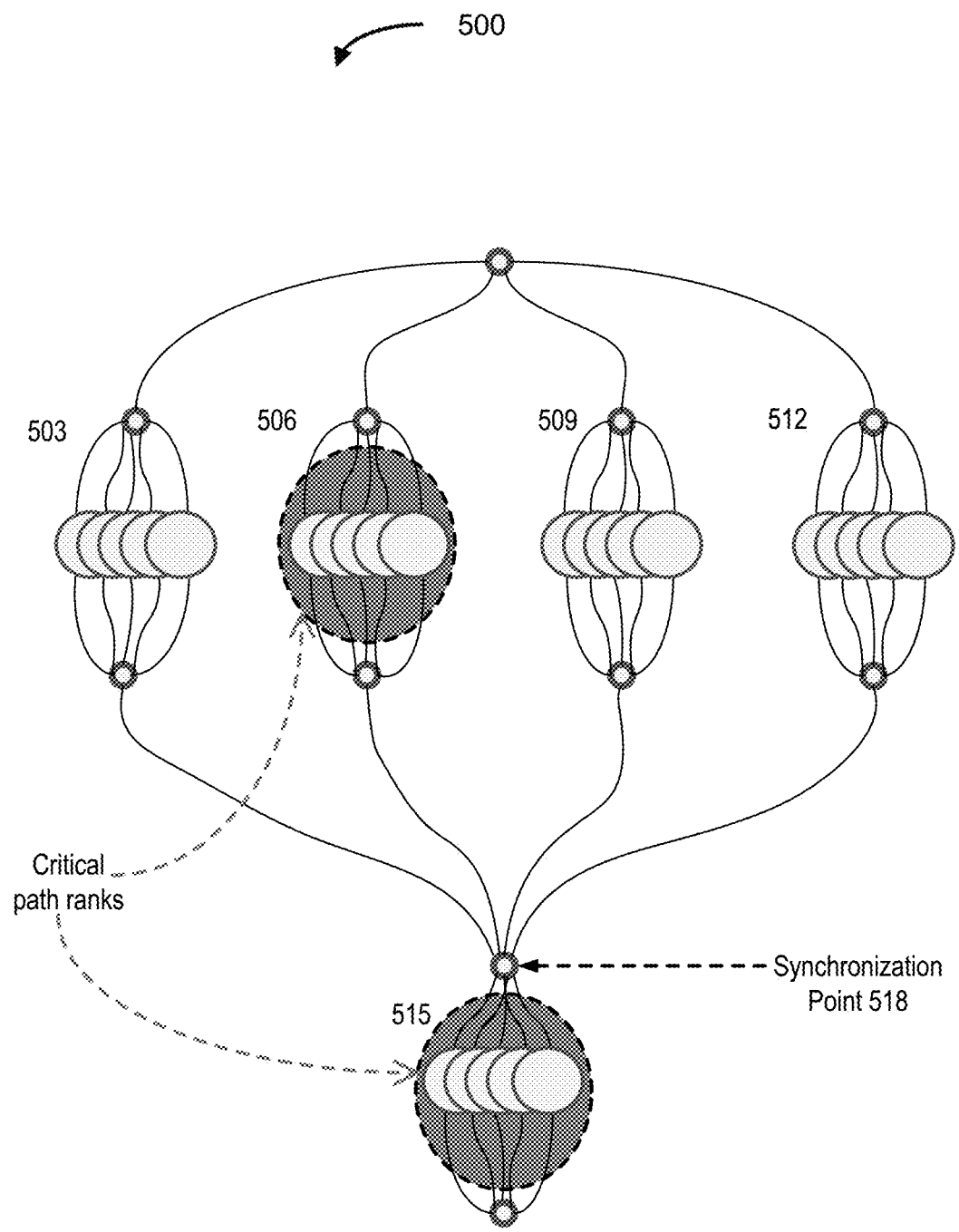
FIG. 5 schematically illustrates a parallel bulk synchronous workload structure, in accordance with various embodiments.

FIG. 5 schematically illustrates a parallel bulk synchronous workload structure 500, in which a critical path optimization may be beneficial. As an example shown in FIG. 5, bundles 503, 506, 509, 512, and 515 may represent respective ranks of Message Passing Interface (MPI) program models that are mapped to respective parallel computing processors to accomplish a particular entry. MPI is a communication protocol for programming parallel computers. Both point-to-point and collective communication are supported. MPI is a message-passing application programmer interface, together with protocol and semantic specifications for how its features must behave in any implementation. MPI's goals may be high performance, scalability, and portability. MPI may become a de facto standard for communication among processes that model a parallel program running on a distributed memory system. Actual distributed memory supercomputers such as computer clusters often run such programs. FIG. 5 shows that the rank of bundle 506 may become a bottleneck of a particular computing entry, where bundle 506 may need longer time to process the assigned computing task than other bundles may spend. Accordingly, the rank of bundle 515 may become another bottleneck since the rank of bundle 515 may require a synchronization at a synchronization point 518. Thus, the rank of bundle 506 may be a critical path rank to the rank of bundle 515.

In some embodiments, a TDP configuration may allocate more TDP budget to the bundle 506 and/or bundle 515, upon successful detection of such bottlenecks, to reduce processing time of the bundle 506 and/or bundle 515 by increasing their operating frequencies, to reduce overall processing time for the entry. One or more priorities may be assigned to the bundle 506 and/or bundle 515. Accordingly, the same or a substantially similar approach to the operation flow/algorithmic structure 400 may be used to determine a set of TDP configurations and/or a safe list.

III. TDP Rebalancing Considering Reactive Thermal Budget Redistribution

In some cases where multiple independent workload entries may be processed by a blade 100 or a board 103a/b of thermally-coupled processors, some of the processing time of entries may be bound or limited by constraints of non-computational resources, other than processors, such as corresponding memory bound. Thus, those processors may not even run up to the allocated TDP budget due to the constraints from other non-computational components.

In some embodiments, a reactive monitor may be implemented to detect such under-utilization of the processors. Then, certain unused TDP budget may be shifted or redistributed from an under-utilized processor to one or more other fully-utilized processors.

In some embodiments, once the under-utilized processors are identified, with or without further unused TDP budget identification, the same or substantially similar approach to the operation flow/algorithmic structure 400 may be used to determine a set of TDP configurations and/or a safe list.

In addition to the above illustrated three TDP rebalancing applications, in some embodiments, one or more of the processors may be configured to operate at high operating frequencies while others may be configured to operate at relatively low operating frequencies. This may cause reduced Mean-Time-To-Failure (MTTF) to the processors operating at high frequencies as a long-term effect, due to long-term overclock. MTTF may indicate a predicted elapsed time between inherent failures of a mechanical or electronic system, which the system may be replaced after a failure, also known as a "non-repairable system." Thus, in some embodiments, the lowest priority processors may be set to operate at a lowest possible operating frequency to offset such reliability impact. Alternatively or additionally, TDP configuration may rotate or randomly assign the processors with the highest priority so that a particular processor may not operate at high frequency all the time.

Figure 6A:
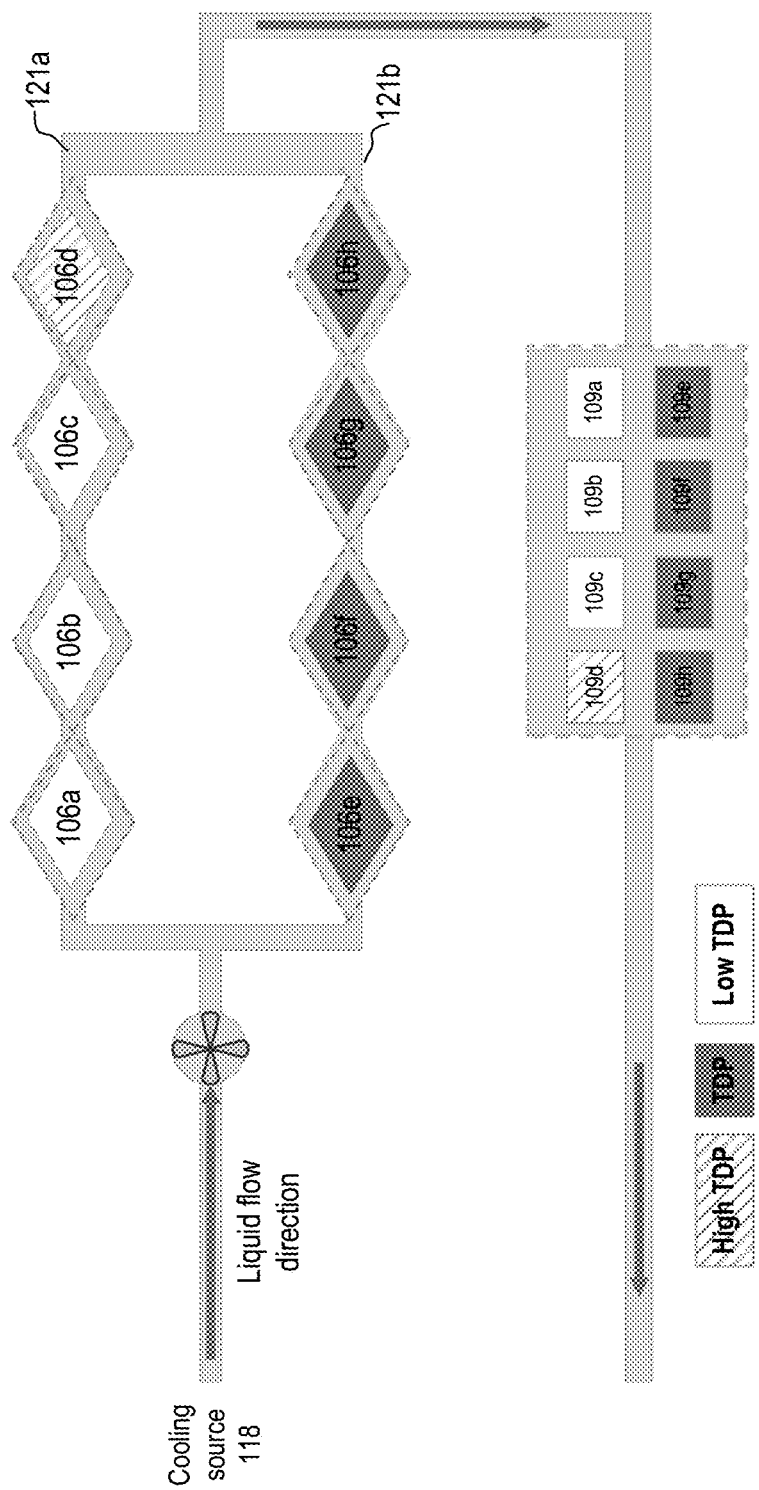
FIGS. 6A-6C illustrate example TDP configurations, in accordance with various embodiments.
Figure 6B:
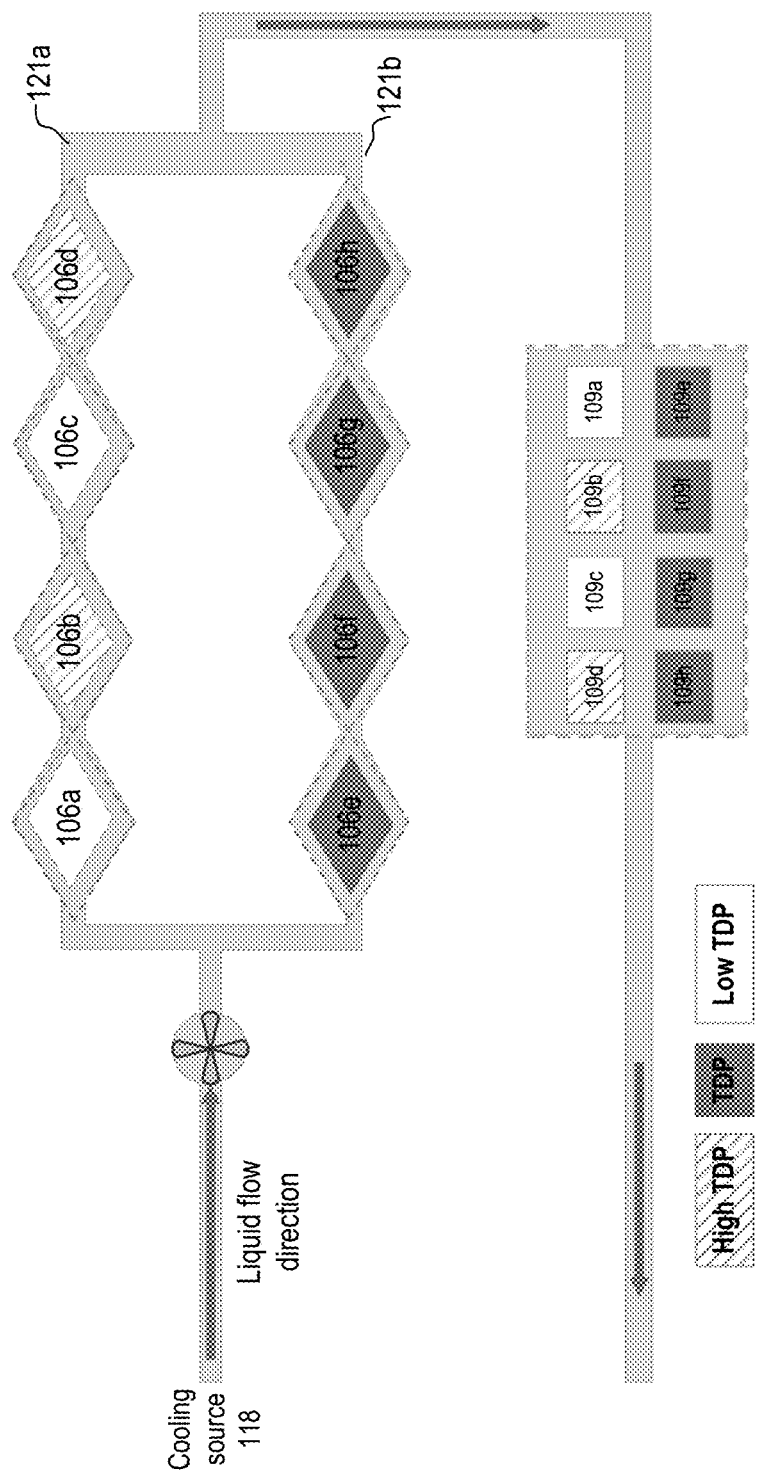
Figure 6C:
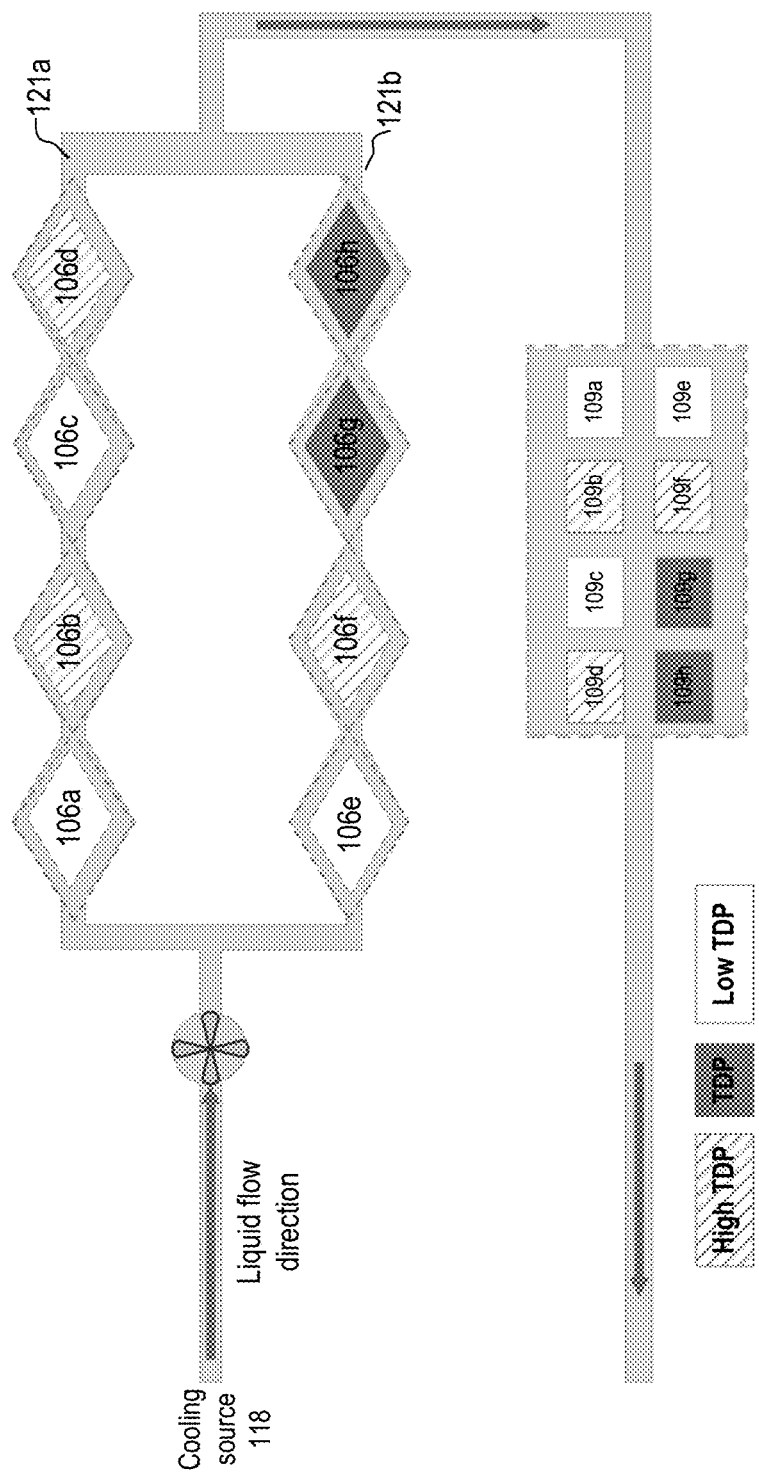

FIGS. 6A-6C show various examples when implementing TDP configurations with various TDP values. In the examples herein, only three TDP values are illustrated, which are baseline TDP (also labelled as "TDP"), low TDP, and high TDP. Note that additional TDP values may be implemented in a system like the system 300, and the specific values of the TDP may affect the TDP configuration with respect to a thermally-coupled set of processors. For example, a maximum number of allowable high TDP values among the thermally-coupled set of processors may be determined by the specific values of the baseline TDP, low TDP, and high TDP, and the numbers of baseline TDP and low TDP that may be allocated.

FIG. 6A illustrates an example TDP configuration according to FIG. 1B, in which the thermally-coupled processors 106a-d may share a common cooling source 118 and a cooling path 121a, and the processors 106a-c may be configured with a low TDP value and the processor 106d may be configured with a high TDP value, whereas the other thermally coupled processor set of the processors 106e-h may be configured with the same baseline TDP value. FIGS. 6B and 6C further illustrate other possible TDP configurations.

IV. TDP Rebalancing for Homogenous Computing

In another example application, the same system 300 or a substantially similar system to the system 300 without the safe list may be used to configure TDP values corresponding to thermally-coupled processors to achieve equal operating frequency among all thermally-coupled processors.

In some embodiments, it may be beneficial to have all the thermally-coupled processors operating at one operating frequency. However, even when the same TDP value is configured to the processors 106a-d, or 106e-h, those processors may not end up operating at the same frequency due to the cooling effect imposed by the cooling system 115. According to FIG. 1A or 1B, when the cooling source 118 of certain liquid flows from the processor 106a to processor 106d, the temperature of the cooling liquid may increase along the line from 106a-106d by absorbing the heat generated by the processors at first. So when the liquid arrives at the later stages of the processors (e.g., the processors 106d and/or 106c), the temperature of the liquid may be much higher than its original temperature at the source, hence reduce its cooling ability to dissipate the heat generated by the later or downstream processors. Therefore, as an example, the processor 106d may experience a higher temperature than the processor 106a. Since the same amount of power is delivered to the processors 106a and 106d based on the same assigned TDP value, the processors 106a and 106d receive the same amount of input power. Meanwhile, the delivered processor power is to be consumed by the processor as static power and dynamic power as shown in the equation: processor power=static power+dynamic power, wherein, the dynamic power is the power consumed by the processor attributable to computing workload and positively related to the operating frequency via a polynomial dependency; and the static power is consumed by the processor without contributing to the workload processing, but rather contributes to heat generation. The higher the ambient temperature is, the more static power may be consumed by the processor, assuming an inverse temperature dependency of voltage is not more dominant than temperature dependency of static power. In some cases, the static power consumption may go exponentially with ambient temperature increase. Thus, the processor 106d may consume much less power as dynamic power and operate at a lower frequency than the processor 106a.

In addition, manufacturing variance and/or material impurity may introduce uneven processor performance as well. For example, even processors with the same design, process and manufacturing may exhibit noticeable operating frequency variance under the same operating conditions.

In some embodiments, a sustainable minimum operating frequency may be desired across the thermally-coupled processors to achieve uniform processor performance.

Figure 7:
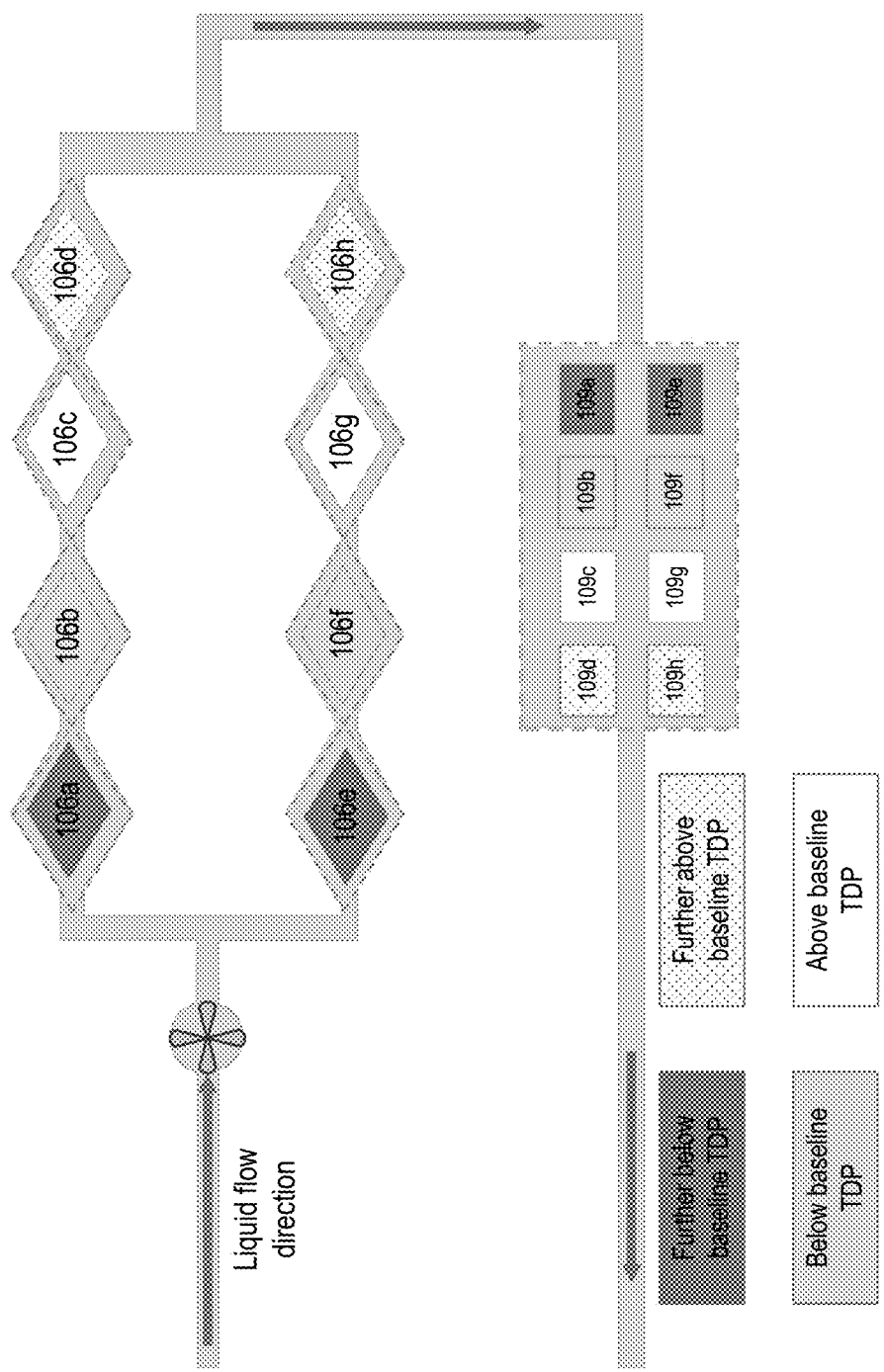
FIG. 7 illustrates a schematic TDP distribution to achieve uniform operating frequency among all thermally-coupled processors, in accordance with various embodiments.

FIG. 7 illustrates a schematic TDP distribution to achieve uniform operating frequency among all thermally-coupled processors. Based on the above discussed, the first stages of the processors (the processors 106a/e/b/f) along a stream of cooling path 121a or 121b may be configured with TDP values below-the-baseline TDP, so that less processor power may be consumed by those processors, since larger portions of the processor power may be consumed by those processors as the dynamic power to operate at an operating frequency. Meanwhile, the last processors (the processors 106d/h/c/g) may be configured with TDP values above-the-baseline TDP values, since smaller portions of the processor power may be consumed by those processors as the dynamic power. As larger processor powers may be delivered to those later processors with above-the-baseline TDP values, ultimately the same amount of dynamic power may be consumed by all of the processors. Further, the processor 106a may be configured with a further below-the-baseline TDP than the processor 106b, as the processor 106a is closer to the cooling source. A similar approach may be applied to the rest of the processors. Therefore, as long as the same amount of dynamic power may be consumed by all the processors, homogeneous operating frequency may be achieved among all the thermally-coupled processors along the common cooling line.

Figure 8:
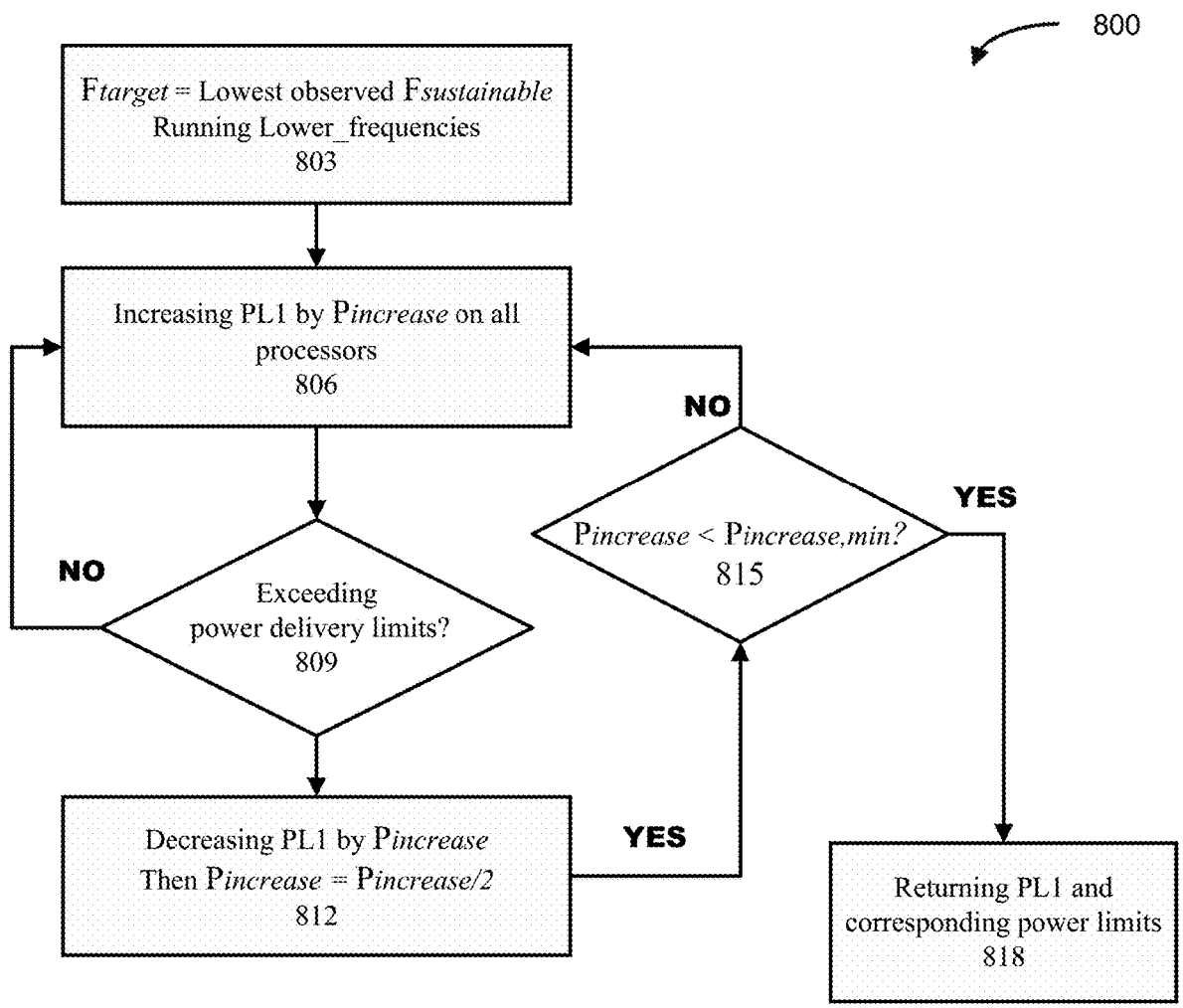
FIG. 8 illustrates an example operation flow/algorithmic structure to facilitate a process of determining homogeneous operating frequency among thermally-coupled processors and corresponding power limits, in accordance with some embodiments.

FIG. 8 illustrates an example operation flow/algorithmic structure 800 to facilitate a process of determining homogeneous operating frequency among thermally-coupled processors and corresponding power limits, in accordance with some embodiments. The operation flow/algorithmic structure 800 may be performed by the system 300 or circuitry thereof. Note that the thermally-coupled processors may not be identical regarding power vs frequency performance. The example operation flow/algorithmic structure 800 may be a part of the cooling system test. The corresponding power limits may be represented by TDP values so that a set of the TDP values may constitute of a TDP configuration to configure the thermally-coupled processors to achieve homogeneous operating frequency.

The operation flow/algorithmic structure 800 may include, at 803, determining a sustainable operating frequency and its corresponding Power Limit (PL), at which the thermally-coupled processors can operate without thermal failure. The thermally-coupled processors may share a common cooling path and be turned on for this procedure. However, all other processors that are not on the cooling path may not be turned on so that the processors on the cooling path may have isolated thermal environment. The sustainable operating frequency may be referred to as the operating frequency corresponding to the guaranteed state of the processor as shown in FIG. 2A, and its corresponding power limit may be referred to as PL1 for discussion herein. The power limit may also correspond to a particular TDP value. This sustainable operating frequency may be predetermined at manufacturing stage or during an initial processor calibration. Once the operating frequency is determined, a "Lower_Frequencies" program may be run to find a converged sustainable operating frequency. An example code for the program is listed as followings:

```
Lower_Frequencies (S, F_target, F_tol):
    run = 1
    while run == 1
        for all p in S
            Change PL1 until F_p == F_target
        run = 0
        for all p in S
            if ABS (F_p - F_target) > F_tol
                run = 1
```

In some embodiments, a TDP kernel may be operating to ensure the sustainable operating frequency would not cause thermal failures or malfunctions. The TDP kernel may include codes from a relevant TDP program. Further, the TDP kernel may be implemented in a firmware read-only memory so that the test can be run from a power management unit or controller. Note that the TDP kernel may be implemented in other forms as well depending on the particular applications.

The operation flow/algorithmic structure 800 may further include, at 806, increasing the PL1 by Pincrease on all processors. By increasing the PL1, all of the processors may increase their processor power, and the Lower_Frequencies program may run continuously to converge to a new operating frequency.

The operation flow/algorithmic structure 800 may further include, at 809, determining whether the increased PL1 causes any components to exceed thermal limits. The thermal limits may be considered to be exceeded if at least one processor, VR, or other relevant component exceeds its threshold temperature. The thermal limits may be determined based on safe operations of corresponding components with respect to thermal specifications. If the determined PL1 configuration does not exceed the thermal limits, another PL1 increment by the amount of Pincrease may be conducted and run another thermal check until another PL1 causes thermal limit exceeding.

The operation flow/algorithmic structure 800 may further include, at 812, decreasing the PL1 by the amount of Pincrease and reducing the Pincrease. The reduced amount may be one half of the current amount of the Pincrease, or some other amounts related to the current amount of the Pincrease.

The operation flow/algorithmic structure 800 may further include, at 815, determining whether the current Pincrease is smaller than a preset minimum increment value, the Pincrease,min. If the increment amount, Pincrease, is larger than or equal to Pincrease,min, Pincrease may be applied to PL1 again and the process goes back to step 806. Otherwise, the cycle may break and the process may go to next step 818.

The operation flow/algorithmic structure 800 may further include, at 818, returning a final PL1 value and corresponding power limits applied to respective processors, in achieving the sustainable operating frequency, which may be a maximum sustainable operating frequency without exceeding thermal limits.

In some embodiments, a power limit of the processor at the opportunistic state 203, as shown in FIG. 2A, may be determined based on the determined PL1. Such the opportunistic power limit may be referred as to PL2 for discussion herein. PL2 may be set to be larger than PL1 with a constant offset value, or other correlations.

Figure 9:
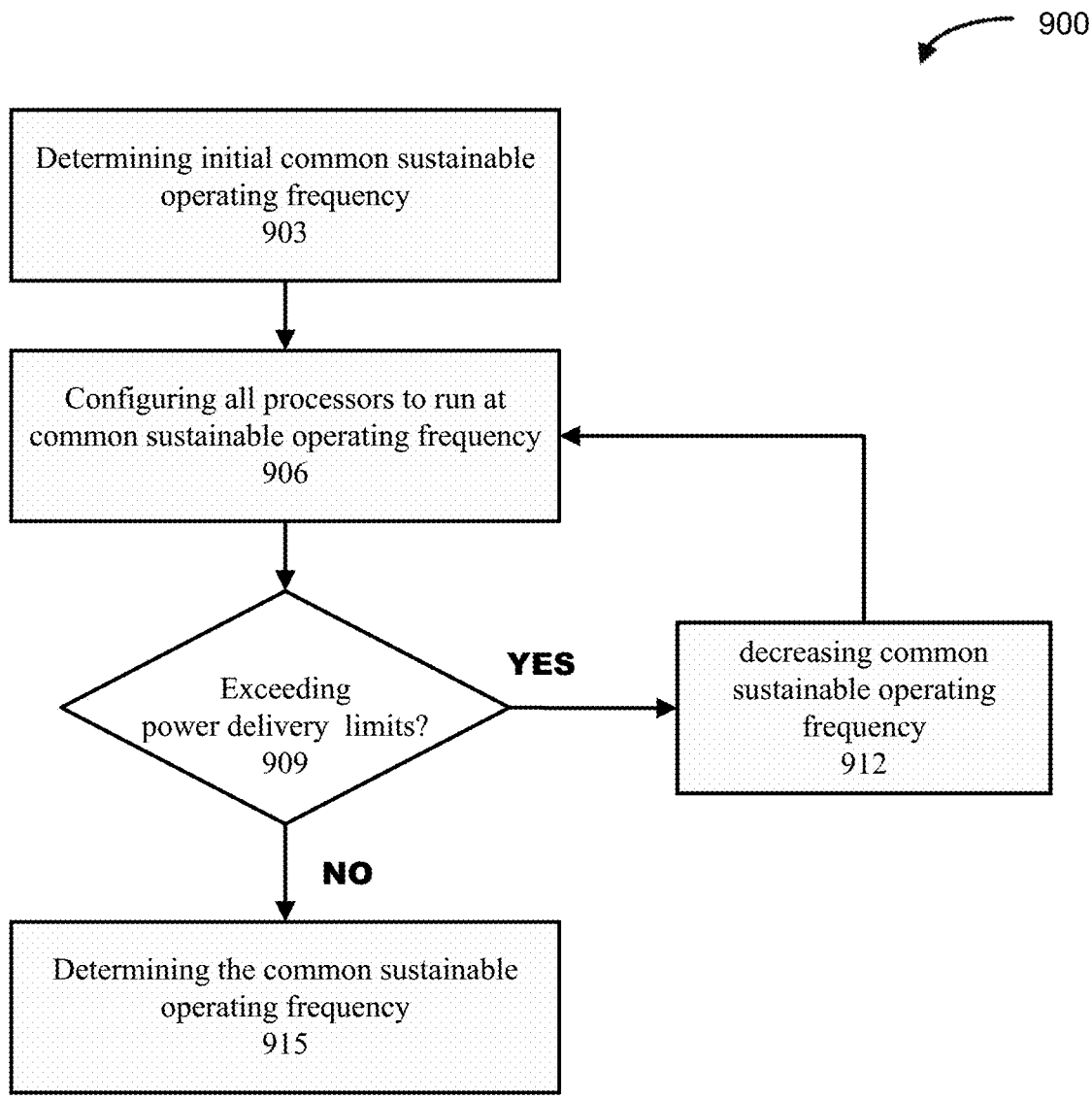
FIG. 9 illustrates an example operation flow/algorithmic structure to facilitate a process of determining a common sustainable operating frequency in an HPC system, in accordance with some embodiments.

In some embodiments, a common sustainable operating frequency may be determined among multiple racks or blades that are not on the same cooling path to achieve homogeneous computing performance among the multiple racks or blades. Once individual sustainable operating frequencies and/or opportunistic operating frequencies of respective cooling paths are determined according to the operation flow 800 at each cooling path, a common sustainable operating frequency and/or opportunistic operating frequency may be sought or determined. Such a common sustainable operating frequency may be a maximum frequency, at which all the processors of the multiple blades may operate without overloading any one of the processors. FIG. 9 illustrates an example operation flow/algorithmic structure 900 to facilitate a process of determining a common sustainable operating frequency in an HPC system, in accordance with some embodiments. The operation flow/algorithmic structure 900 may be performed by the system 300 or circuitry thereof. Note that the HPC system may include a plurality of racks/blades that may further include thermally-coupled and non-thermally coupled processors. The example operation flow/algorithmic structure 900 may be a part of the cooling system test.

The operation flow/algorithmic structure 900 may include, at 903, determining an initial common sustainable operating frequency, which is a minimum frequency among all the sustainable operating frequencies with respect to respective cooling paths. The individual sustainable operating frequencies of corresponding cooling paths may be determined based on the above-mentioned operation flow 800.

The operation flow/algorithmic structure 900 may further include, at 906, configuring all processors to run at the common sustainable operating frequency, wherein the TDP kernel may be running simultaneously at or for each one of the processors. Initially, all the processors may be configured to run at the initial common sustainable operating frequency.

The operation flow/algorithmic structure 900 may further include, at 909, determining whether any power delivery limit(s) is being exceed. The power delivery limits may be considered to be exceeded if at least one processor, VR, or other relevant component exceeds its threshold temperature. The thermal limits may be determined based on safe operations of corresponding components with respect to thermal specifications. If the power delivery limits are being exceeded, the operation flow/algorithmic structure 900 may go to step 912. Otherwise, if none of the power delivery limits is exceeded, the operation flow/algorithmic structure 900 may go to step 915.

The operation flow/algorithmic structure 900 may further include, at 912, decreasing the current common sustainable operating frequency. The decrement of the frequency may be based on certain algorithm or formula, but not limited to certain methods. The decreased common sustainable frequency may be configured to all the processors similarly as to step 906. Then, a determination of power delivery limit exceeding or violation may be performed similarly as to at step 909.

The operation flow/algorithmic structure 900 may further include, at 915, determining the common sustainable operating frequency for all of the processors, if no power delivery limit is violated or exceeded. This finalized common sustainable operating frequency may be used to render homogeneous computing power among all of the processors in a multi-blade system.

Embodiments described herein may include, for example, apparatuses, systems, methods, and storage media for implementing and configuring, or related to, in-field on-chip functional tests on key components of ICs to ensure safe operations of the ICs and systems. Those key elements include, but are not limited to, computing cores, graphics engines, other SOC engines, I/O ports, I/O fabrics, memory fabrics, memory controllers, and any other elements on SOCs.

Figure 10:
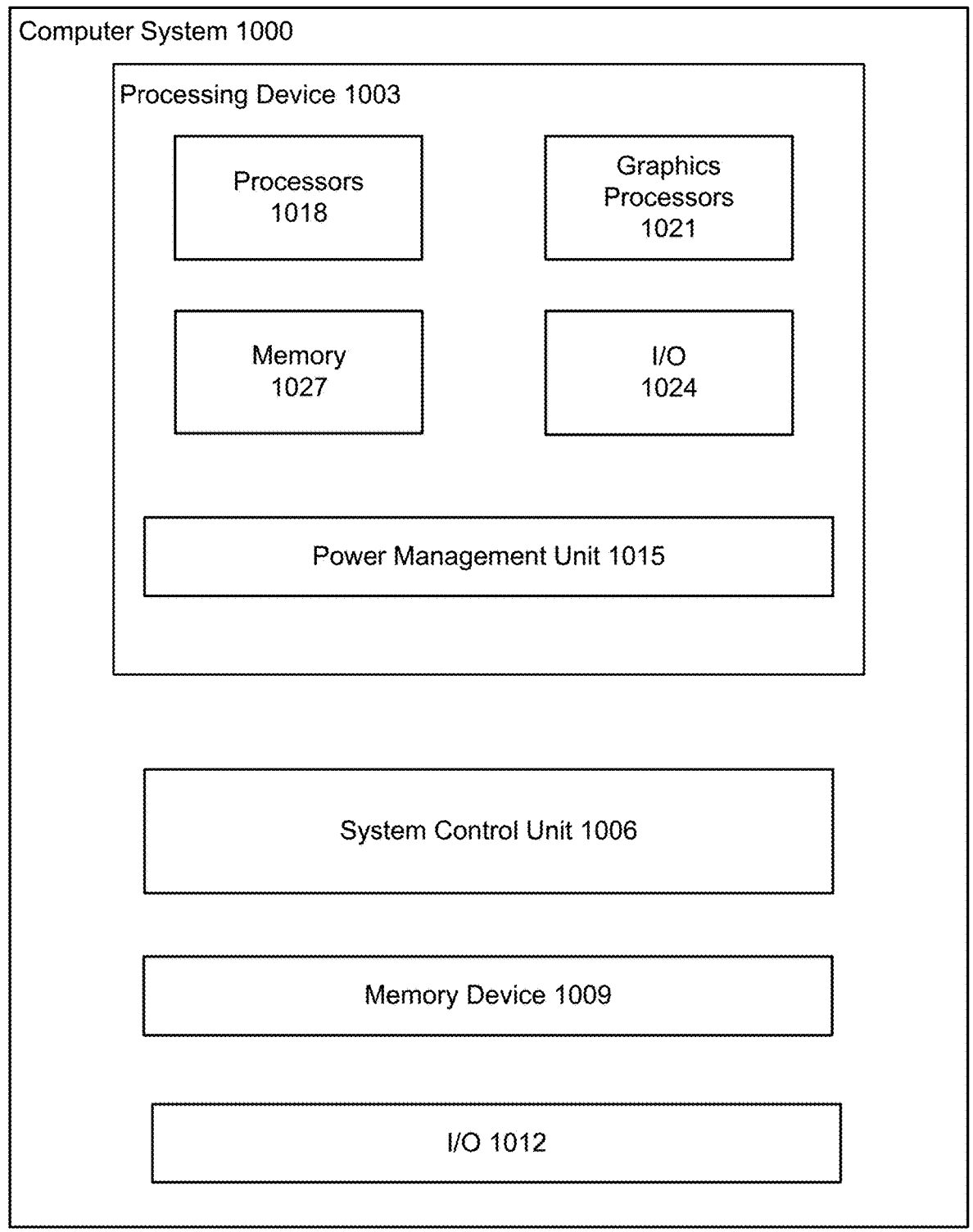
FIG. 10 illustrates an embodiment of an example computer system suitable for implementing various embodiments described herein.

FIG. 10 illustrates an embodiment of an example computer system 1000 suitable for implementing various embodiments described herein. In various embodiments, the computer system 1000 comprises a processing device 1003, a system control unit 1006, a memory device 1009, and an input/output (I/O) device 1012. The processing device 1003 may be any type of computational element, such as but not limited to, a server (e.g., in a bay in a rack of servers), a microprocessor, a processor, central processing unit, digital signal processing unit, dual core processor, mobile device processor, desktop processor, single core processor, a system-on-chip (SOC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing device 1003 may be coupled to and communicate with the system control unit 1006, the memory device 1009, and the I/O device 1012. Moreover, the system control unit 1006, the memory device 1009, and the I/O device 1012 may communicate with all of the components of the processing device 1003. While not limited in this respect, the processing device 1003 may comprise a power management unit 1015, one or more processors 1018, one or more graphics processors 1021, an I/O device 1024, a memory 1027, and any other uncore (non-core) components (not shown). Uncore components may include other memory, caches, I/O devices and controllers. The one or more processors 1018 include, but are not limited to, pre-fetch logic to fetch instructions, decode logic to decode the instructions, execution logic to execute instructions, and other logic. The one or more graphics processors 1021 may function as an adjunct processor that manages graphics and/or video operations and/or processing. The I/O device 1024 may provide an external interface for the processing device 1003 to other devices within the computer system 1000. In addition, the memory device 1009 stores instructions and/or data of the processing device 1003, and in particular, the one or more processors 1018. The memory device 1027 may also store temporary variables or other intermediate information while the processing device 1003 and the one or more processors 1018 are executing instructions. In another embodiment, the memory device 1027 includes, but is not limited to, level one (L1), level two (L2) and level three (L3) cache memory or any other configuration of the cache memory within the processing device 1003. The processors 1018, the one or more graphics processors 1021, the I/O device 1024, and the memory device 1027 may communicate with each other via interconnects (not shown). The system control unit 1006 may include a microcontroller or other type of processing circuitry, memory and interface logic. In some embodiments, the system control unit 1006 may monitor and control operation of the computer system 1000 including, but not limited, monitoring and controlling operation of the memory device 1009 and the I/O device 1012. The system control unit 1006 may also monitor and control various aspects of the processing device 1003, including but not limited to, communication between various components of the computer system 1000 and the processing device 1003. In various embodiments, the controller may be coupled with the processing device 1003. The memory device 1009 stores instructions and/or data of the computer system 1000. The memory device 1009 may also store temporary variables or other intermediate information while the computer system 1000 is executing instructions. The I/O device 1012 is the interface between the computer system 1000 and an external system or device.

In one embodiment, the I/O device 1012 may communicate with the processing device 1003 through the I/O device 1024. The power management unit 1015, the memory device 1009 and the I/O device 1012 may also communicate with each other via interconnects (not shown). The components illustrated in the computer system 1000 are not meant to be limiting and are presented for purposes of illustration. In other embodiments, the configuration of the computer system 1000 may include other (more or fewer) components than shown in FIG. 10. One of ordinary skill in the relevant art will appreciate that other configurations of the computer system 1000 can be used without affecting the workings of the embodiments described herein.

In certain embodiments, the power management unit 1015 may be configured to provide dynamic spatial power steering among a plurality of power domains in the processing device 1003 on a per phase basis of a particular application. The power domains may include, for example, a processor domain comprising the one or more processors 1018, and an uncore domain comprising the one or more graphics processors 1021, the I/O device 1024, the memory device 1027, and any other uncore components (not shown). In addition, or in other embodiments, the one or more processors 1018 may comprise a plurality of power domains, each corresponding to a respective processing core or group of cores of any size (not necessarily uniformly sized). Further, any of the elements shown in FIG. 10 (i.e., the system control unit 1006, the memory device 1009, the I/O device 1012, the processing device 1003, the power management unit 1015, the one or more processors 1018, the one or more graphics processors 1021, the I/O device 1024, and the memory device 1027) may be a separate power domain, combined with any other element(s) in a separate power domain, and/or divided into a plurality of different power domains.

The one or more processors 1018 may execute applications that demonstrate behavior where the same phases occur over and over again. Because each of the phases may have different resource needs and generate different amounts of activity in the resources on the processing device 1003, the best allocation of power among resources or domains on the processing device 1003 may be different for each phase. To achieve optimal or improved performance (or maximize other power management objective functions such as efficiency, EDP, ED2P, etc.), the power management unit 1015 is configured according to certain embodiments to reallocate power between the different power domains differently based on the current phase being processed.

In some embodiments, the power management unit 1015 may include or be in connection with the TDP rebalancing control system 300. Certain parts (management unit 309 and/or configuration unit 303) of the system 300 may be implemented within processor circuitry, a standalone power management circuitry of the power management unit 1015 or circuitry coupled with certain software, firmware, or hardware. One or more operation flows illustrated with respect to FIGS. 4, 8, and 9 may be implemented within one or more power management processes.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 is an apparatus of a thermal design power (TDP) balancing integrated circuit (IC), comprising: management circuitry, to receive, via one or more telemetries, operational information respectively with regard to thermally-coupled processors on a same cooling path, and determine a TDP configuration for the thermally-coupled processors based on the operational information, the TDP configuration includes a plurality of TDP values that are to be configured for the thermally-coupled processors respectively; and configuration circuitry to configure the TDP configuration for the thermally-coupled processors.

Example 2 is the apparatus of example 1 and/or some other examples herein, wherein the operational information includes, at least one of, thermal information, power consumption information, and status information with respect to each processor of the individual thermally-coupled processors, wherein the status information indicates an active status or an idle status, or a guaranteed state or an opportunistic state.

Example 3 is the apparatus of example 2 and/or some other examples herein, wherein the management circuitry is further to determine at least one bottleneck processor of the thermally-coupled processors based on the detected operational information, wherein the bottleneck processor requires more time to process a computing entry than the other thermally-coupled processors in a bulk synchronous parallel computation; and wherein to determine the TDP configuration, the management circuitry is to increase at least one TDP value to be configured for the at least one bottleneck processor.

Example 4 is the apparatus of example 3 and/or some other examples herein, wherein to increase at least one TDP value corresponds to configuring a higher operating frequency for the at least one bottleneck processor or allocating a higher power consumption for the at least one bottleneck processor.

Example 5 is the apparatus of example 2 and/or some other examples herein, wherein the management circuitry is further to obtain respective thermal measurements with regard to the thermally-coupled processors via the one or more telemetries, to determine the thermal information.

Example 5.1 is the apparatus of example 1 and/or some other examples herein, wherein the management circuitry is further to receive at least one indication to indicate a violation of at least one thermal limit based on thermal measurements with regard to the thermally-coupled processors via the one or more telemetries.

Example 6 is the apparatus of example 1 and/or some other examples herein, wherein the thermally-coupled processors share a common cooling source, and the cooling source is liquid or gas.

Example 7 is the apparatus of example 6 and/or some other examples herein, wherein to configure the TDP configuration, the management circuitry is to configure a first TDP value for a first processor of the thermally-coupled processors, wherein the first TDP value has an increased amount compared with a current TDP value of the first processor; and configure a second TDP value for a second processor of the thermally-coupled processors, wherein the second TDP value has a decreased amount compared with a current TDP value of the second processor; wherein the first processor is an under-utilized processor that operates below the current TDP value of the first processor when the first processor operates at a highest frequency of which the first processor is capable in a computing environment, and the second processor is an over-utilized processor that operates at or above a current TDP budget of the second processor; and the first TDP value and the second TDP value are part of the TDP configuration.

Example 7.1 is the apparatus of example 6 and/or some other examples herein, wherein the management circuitry is further to determine that a first processor of the thermally-coupled processor is under-utilized if the first processor operates below a current TDP value of the first processor when the first processor operates at a highest frequency of which the first processor is capable in a computing environment; determine that a second processor of the thermally-coupled processor is over-utilized if the second processor operates at or above the current TDP value of the second processor; increase the current TDP value of the first processor by an delta amount to generate an updated TDP value for the first processor; decrease the current TDP value of the second processor by the delta amount to generate an updated TDP value for the second processor; and configure an updated TDP configuration to include the updated TDP values for the first processor and the second processor.

Example 8 is the apparatus of example 1 and/or some other examples herein, wherein the management circuitry is further to receive priority information with respect to an entry of workload, the priority information includes a set of priorities respectively corresponding to the thermally-coupled processors; wherein to determine the TDP configuration, the management circuitry is to determine the TDP configuration for the thermally-coupled processors based on the operational information and the priority information.

Example 8.1 is the apparatus of example 8 and/or some other examples herein, wherein the set of priorities is determined based on user related priorities.

Example 8.2 is the apparatus of example 8 and/or some other examples herein, wherein the set of priorities is determined based on entry related priorities.

Example 8.3 is the apparatus of example 8 and/or some other examples herein, wherein to determine the TDP configuration for the thermally-coupled processors based on the operational information and the priority information, the management circuitry is to determine an initial TDP configuration based on the priority information with respect to the entry; and compare an entry quality of the initial TDP configuration with an entry quality designated.

Example 8.4 is the apparatus of example 8.3 and/or some other examples herein, wherein the initial TDP configuration is selected as a highest match based on the priority information, the selection is from a plurality of possible TDP configurations and each possible TDP configuration includes a TDP value combination that can satisfy thermal requirements.

Example 8.5 is the apparatus of example 8.3 and/or some other examples herein, wherein the management circuitry is further to determine that no feasible TDP configuration can satisfy the priority information.

Example 8.6 is the apparatus of example 8.3 and/or some other examples herein, wherein the management circuitry is further to determine whether the initial TDP configuration satisfies thermal requirements or thermal limits with respect to the thermally-coupled processors and associated voltage regulators.

Example 8.7 is the apparatus of example 8.6 and/or some other examples herein, wherein the management circuitry is further to reduce one or more TDP values of the initial TDP configuration if at least one of the thermally-coupled processors and associated voltage regulators fails at least one thermal limit of the thermal requirements under the initial TDP configuration; and the configuration circuitry is further to configure the reduced TDP configuration for the thermally-coupled processors.

Example 8.8 is the apparatus of example 8.7 and/or some other examples herein, wherein to reduce the one or more TDP values, the management circuitry is to select a next highest match from the plurality of possible TDP configurations.

Example 8.9 is the apparatus of example 8.7 and/or some other examples herein, wherein the management circuitry is further to determine that the reduced TDP configuration satisfies the thermal requirements or thermal limits.

Example 9 is the apparatus of example 1 and/or some other examples herein, wherein the management circuitry is further to determine a set of TDP configurations for the thermally-coupled processors, wherein each TDP configuration of the set of TDP configurations satisfies thermal requirements with respect to the thermally-coupled processors and their associated voltage regulators; and store the set of TDP configurations in a safe list, wherein the TDP configuration is determined from the set of TDP configurations.

Example 10 is the apparatus of example 9 and/or some other examples herein, further comprising the safe list, the safe list includes a plurality of TDP configurations that satisfy the thermal requirements.

Example 11 is the apparatus of example 1 and/or some other examples herein, wherein the plurality of TDP values correspond to configuring respective thermally-coupled processors with a guaranteed operating frequency and an opportunistic operating frequency.

Example 12 is the apparatus of example 1 and/or some other examples herein, wherein the operational information includes respective thermal information of a plurality of voltage regulators associated with the thermally-coupled processors.

Example 13 is a system for performing a thermal design power (TDP) balancing, comprising a power management unit that performs the same or substantial similarly as the management circuitry of examples 1-12; and a configuration control unit that performs the same or substantial similarly as the configuration circuity of examples 1-12

Example 14 is one or more non-transitory computer-readable media (NTCRM) comprising instructions to, upon execution of the instructions by an integrated circuit (IC), cause the IC to determine a sustainable operating frequency of thermally-coupled processors that share a common cooling path; and determine an opportunistic operating frequency for the thermally-coupled processors based on the sustainable operating frequency.

Example 15 is the one or more NTCRM of example 14 and/or some other examples herein, wherein the thermally-coupled processors have same specifications and are from same manufacturing bin.

Example 16 is the one or more NTCRM of example 14 and/or some other examples herein, wherein to determine a sustainable operating frequency of thermally-coupled processors, the instructions, upon execution, cause the IC to determine an operating frequency of one processor of the thermally-coupled processors according to a TDP kernel program or operation, wherein the operating frequency is a highest frequency at which the processor can operate without exceeding a thermal limit of specified thermal requirements; configure all of the thermally-coupled processors with the determined operating frequency; and determine whether any of the thermally-coupled processors and associated voltage regulators exceeds any thermal limit of the specified thermal requirements.

Example 16.1 is the one or more NTCRM of example 16 and/or some other examples herein, wherein to determine a sustainable operating frequency of thermally-coupled processors, the instructions, upon execution, further cause the IC to increase the operating frequency by a delta frequency, if all of the thermally-coupled processors and the associated voltage regulators satisfy the specified thermal requirements.

Example 16.2 is the one or more NTCRM of example 16.1 and/or some other examples herein, wherein to determine a sustainable operating frequency of thermally-coupled processors, the instructions, upon execution, further cause the IC to roll back the delta frequency to the operating frequency, if at least one of the thermally-coupled processors and the associated voltage regulators exceeds at least one thermal limit of the thermal requirements; reduce the delta frequency by one half, or another ratio; and increase the rolled-back operating frequency by the newly reduced delta frequency.

Example 16.3 is the one or more NTCRM of example 16.2 and/or some other examples herein, wherein to determine a sustainable operating frequency of thermally-coupled processors, the instructions, upon execution, further cause the IC to configure all the thermally-coupled processors with the newly increased operating frequency; and determine whether at least one of the thermally-coupled processors and the associated voltage regulators exceeds any thermal limit of the specified thermal requirements under processor operations of the reduced operating frequency.

Example 16.4 is the one or more NTCRM of example 16.3 and/or some other examples herein, wherein to determine a sustainable operating frequency of thermally-coupled processors, the instructions, upon execution, further cause the IC to determine whether the newly reduced delta frequency is smaller than a minimum delta frequency, if all of the thermally-coupled processors and the associated voltage regulators satisfy the thermal requirements.

Example 16.5 is the one or more NTCRM of example 16.4 and/or some other examples herein, wherein to determine a sustainable operating frequency of thermally-coupled processors, the instructions, upon execution, further cause the IC to determine the sustainable operating frequency that is a maximum operating frequency while all of the thermally-coupled processors and the associated voltage regulators satisfy the specified thermal requirements under processor operations of the maximum operating frequency, if the newly reduced delta frequency is smaller than a minimum delta frequency.

Example 17 is the one or more NTCRM of example 14 and/or some other examples herein, wherein the instructions, upon execution, further cause the IC to determine a sustainable frequency for a plurality of blades, wherein the plurality of blades have different cooling paths.

Example 18 is the one or more NTCRM of example 17 and/or some other examples herein, wherein to determine a sustainable frequency for a plurality of blades, the instructions, upon execution, cause the IC to determine a minimum sustainable operating frequency based on a plurality of sustainable operating frequencies of respective blades of the plurality of blades; configure all processors of the plurality of blades with the minimum sustainable operating frequency; and determine whether at least one of the processors and associated voltage regulators exceeds at least one thermal limits of the specified thermal requirements.

Example 18.1 is the one or more NTCRM of example 18 and/or some other examples herein, wherein to determine a sustainable frequency for a plurality of blades, the instructions, upon execution, further cause the IC to reduce the minimum sustainable operating frequency if the at least one of the processors and associated voltage regulators exceeds at least one thermal limits of the specified thermal requirements; configure all processors of the plurality of blades with the reduced minimum sustainable operating frequency.

Example 18.2 is the one or more NTCRM of example 18.1 and/or some other examples herein, wherein to determine a sustainable frequency for a plurality of blades, the instructions, upon execution, further cause the IC to determine a sustainable operating frequency for all the processors, if all the processors and the associated regulators satisfy the specified thermal requirements.

Example 19 may include an apparatus comprising means to perform one or more elements of a method described in or related to any of examples 1-18.2, or any other method or process described in the present disclosure.

Example 20 may include one or more non-transitory computer-readable media comprising instructions to cause an electronic device, upon execution of the instructions by one or more processors of the electronic device, to perform one or more elements of a method described in or related to any of examples 1-18.2, or any other method or process described in the present disclosure.

Example 21 may include an apparatus comprising logic, modules, or circuitry to perform one or more elements of a method described in or related to any of examples 1-18.2, or any other method or process described in the present disclosure.

Example 22 includes a method, technique, or process as described in or related to any of examples 1-18.2, or portions or parts thereof, or otherwise described in the present disclosure.

Example 23 includes an apparatus comprising: one or more processors and one or more computer-readable media comprising instructions that, when executed by the one or more processors, cause the one or more processors to perform the method, techniques, or process as described in or related to any of examples 1-18.2, or portions thereof, or otherwise described in the present disclosure. The one or more computer-readable media may be one transitory or non-transitory computer-readable media.

Example 24 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-18.2, or portions thereof, or otherwise described in the present disclosure.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. An apparatus of a thermal design power (TDP) balancing integrated circuit (IC), comprising:
   management circuitry, to:
   receive, via one or more telemetries, operational information with regard to respective thermally-coupled processors on a same cooling path;
   determine at least one bottleneck processor of the thermally-coupled processors based on the operational information, wherein the at least one bottleneck processor requires more time to process a computing entry than other processors of the thermally-coupled processors in a bulk synchronous parallel computation;
   determine a TDP configuration for the thermally-coupled processors based on the operational information, wherein the TDP configuration includes a plurality of TDP values that are to be configured for the thermally-coupled processors respectively, and wherein to determine the TDP configuration, the management circuitry is to increase at least one TDP value to be configured for the at least one bottleneck processor; and
   configuration circuitry to configure the TDP configuration for the thermally-coupled processors.

2. The apparatus of claim 1, wherein the operational information includes at least one of thermal information, power consumption information, and status information with respect to each processor of the individual thermally-coupled processors, wherein the status information indicates an active status or an idle status, or a guaranteed state or an opportunistic state.

3. The apparatus of claim 1, wherein to increase at least one TDP value corresponds to configuring a higher operating frequency for the at least one bottleneck processor or allocating a higher power consumption for the at least one bottleneck processor.

4. The apparatus of claim 2, wherein the management circuitry is further to obtain respective thermal measurements with regard to the thermally-coupled processors via the one or more telemetries, to determine the thermal information.

5. The apparatus of claim 4, wherein the thermally-coupled processors share a common cooling source, and the cooling source is liquid or gas.

6. The apparatus of claim 5, wherein to configure the TDP configuration, the management circuitry is to:
configure a first TDP value for a first processor of the thermally-coupled processors, wherein the first TDP value has an increased amount compared with a current TDP value of the first processor; and
configure a second TDP value for a second processor of the thermally-coupled processors, wherein the second TDP value has a decreased amount compared with a current TDP value of the second processor;
wherein the first processor is an under-utilized processor that operates below the current TDP value of the first processor when the first processor operates at a highest frequency of which the first processor is capable in a computing environment, and the second processor is an over-utilized processor that operates at or above the current TDP value of the second processor; and the first TDP value and the second TDP value are part of the TDP configuration.

7. The apparatus of claim 1, wherein the management circuitry is further to:
determine a set of TDP configurations for the thermally-coupled processors, wherein each TDP configuration of the set of TDP configurations satisfies thermal requirements with respect to the thermally-coupled processors; and
store the set of TDP configurations in a safe list, wherein the TDP configuration is determined from the set of TDP configurations.

8. The apparatus of claim 1, wherein the plurality of TDP values correspond to configuring respective thermally-coupled processors with a guaranteed operating frequency and an opportunistic operating frequency.

9. The apparatus of claim 1, wherein the operational information includes respective thermal information of a plurality of voltage regulators associated with the thermally-coupled processors.

10. A system for performing a thermal design power (TDP) balancing, comprising:
a power management unit to:
collect operational information of individual processors that are thermally-coupled and share a common cooling path; and
determine a set of TDP budgets with respect to the individual processors based on the operational information; and
a configuration control unit to respectively configure the set of TDP budgets for the individual processors;
wherein each TDP budget of the set of TDP budgets is to configure one processor of the individual processors with a power consumption limit to achieve a common sustainable operating frequency among all of the individual processors, wherein all the individual processors operate at the common sustainable operating frequency under compliance of thermal requirements, further wherein the thermal requirements include one or more thermal temperature limits under which the individual processors and their associated voltage regulators are required to operate.

11. The system of claim 10, wherein the operational information of individual processors includes at least one of thermal information, power consumption information, and status information with respect to the individual processors, wherein the status information indicates an active status or an idle status, or a guaranteed state or an opportunistic state for processor operation.

12. The system of claim 10, wherein the power consumption limit is to limit a dynamic power consumption attributable to a computing operation of the processor, or to limit a processor power consumption that corresponds to a total power consumption by the processor, wherein the total power consumption includes the dynamic power consumption and a static power attributable to non-computing operation of the processor.

13. The system of claim 10, wherein the power management unit is further to:
determine a plurality of common sustainable operating frequencies, wherein the plurality of common sustainable operating frequencies corresponds to a plurality sets of thermally-coupled processors;
determine a minimum frequency based on the plurality of common sustainable operating frequencies;
determine whether the one or more thermal limits are satisfied while the plurality sets of thermally-coupled processors run at the minimum frequency;
decrease the minimum frequency based on determining the at least one of the one or more thermal limits is not satisfied; and
determine a final common sustainable operating frequency at which the plurality sets of thermally-coupled processors run while satisfying the thermal requirements.

14. One or more non-transitory computer-readable media (NTCRM) comprising instructions to, upon execution of the instructions by an integrated circuit (IC), cause the IC to:
determine a set of thermal design power (TDP) budgets to a set of thermally-coupled processors with respect to an entry of computing workload, based on respective priorities designated to the thermally-coupled processors with respect to the entry;
generate a TDP configuration to include the set of TDP budgets for configuring the thermally coupled processors, wherein each TDP budget of the set of TDP budgets corresponds to at least one of a TDP power budget that is to be allocated to a processor of the thermally-coupled processors, an operating frequency of the processor, and an operating voltage of the processor that is provided by an associated voltage regulator of the processor; and
determine whether any of the thermally-coupled processors and associated voltage regulators fails corresponding one or more thermal limits when the thermally-coupled processors are operating under the TDP configuration.

15. The one or more NTCRM of claim 14, wherein the respective priorities correspond to a user priority.

16. The one or more NTCRM of claim 14, wherein the instructions, upon execution, further cause the IC to:
determine that at least one of the thermally-coupled processors and the associated voltage regulators fails the one or more thermal limits under the TDP configuration; and
determine a different set of TDP budgets for the thermally-coupled processors, wherein the different set of TDP budgets has a lower total TDP budget than the TDP configuration has, and the total TDP budget is to add up each TDP budget of the different set of TDP budgets.

17. The one or more NTCRM of claim 16, wherein the instructions, upon execution, further cause the IC to determine that no set of TDP budgets is feasible to satisfy the respective priorities with respect to the entry.

18. The one or more NTCRM of claim 16, wherein the instructions, upon execution, further cause the IC to determine the different set of TDP budgets satisfy the one or more thermal limits.

19. An apparatus of an integrated circuit (IC), comprising:
means for determining a sustainable operating frequency for thermally-coupled processors that share a common cooling path;
means for configuring a minimum operating frequency as an initial value of the sustainable operating frequency based on a plurality of sustainable operating frequencies for a plurality of blades, wherein each blade includes a set of the thermally-coupled processors;
means for determining whether at least one processor of the plurality of blades exceeds a thermal threshold while all processors of the plurality of blades operate at the minimum operating frequency;
means for determining an opportunistic operating frequency for the thermally-coupled processors based on the sustainable operating frequency; and
means for configuring the thermally-coupled processors with the sustainable operating frequency.

20. The apparatus of claim 19, further comprising means for determining a final sustainable operating frequency if no processor of the plurality of blades exceeds the thermal threshold and all the processors of the plurality of blades operate at the final sustainable operating frequency.

21. The apparatus of claim 20, further comprising:
means for determining a final opportunistic operating frequency based on the final sustainable operating frequency; and
means for configuring corresponding operations with respect to both the final sustainable operating frequency and the final sustainable operating frequency for the processors of the plurality of blades.

22. One or more non-transitory computer-readable media (NTCRM) comprising instructions to, upon execution of the instructions by an integrated circuit (IC), cause the IC to:
determine a set of thermal design power (TDP) budgets to a set of thermally-coupled processors with respect to an entry of computing workload, based on respective priorities designated to the thermally-coupled processors with respect to the entry;
generate a TDP configuration to include the set of TDP budgets for configuring the thermally coupled processors; and
determine that at least one of the thermally-coupled processors and associated voltage regulators fails corresponding one or more thermal limits when the thermally-coupled processors are operating under the TDP configuration; and
determine a different set of TDP budgets for the thermally-coupled processors, wherein the different set of TDP budgets has a lower total TDP budget than the TDP configuration has, and the total TDP budget is to add up each TDP budget of the different set of TDP budgets.

23. The one or more NTCRM of claim 22, wherein the instructions, upon execution, further cause the IC to determine that no set of TDP budgets is feasible to satisfy the respective priorities with respect to the entry.

24. The one or more NTCRM of claim 22, wherein the instructions, upon execution, further cause the IC to determine the different set of TDP budgets satisfy the one or more thermal limits.

* * * * *